US012650768B2

(12) United States Patent
Brown et al.

(10) Patent No.: US 12,650,768 B2
(45) Date of Patent: Jun. 9, 2026

(54) CROSS-SITE HIGH-AVAILABILITY DISTRIBUTED CLOUD STORAGE SYSTEM TO PROVIDE MULTIPLE VIRTUAL CHANNELS BETWEEN STORAGE NODES

(71) Applicant: NetApp, Inc., San Jose, CA (US)

(72) Inventors: Peter Brown, Raleigh, NC (US); Houze Xu, Lexington, MA (US); Bipin Tomar, Morrisville, NC (US); Joseph Brown, Jr., Raleigh, NC (US)

(73) Assignee: NETAPP, INC., San Jose, CA (US)

( * ) Notice: Subject to any disclaimer, the term of this patent is extended or adjusted under 35 U.S.C. 154(b) by 829 days.

(21) Appl. No.: 17/692,531

(22) Filed: Mar. 11, 2022

(65) Prior Publication Data
US 2022/0404980 A1      Dec. 22, 2022

Related U.S. Application Data

(60) Provisional application No. 63/212,629, filed on Jun. 19, 2021.

(51) Int. Cl.
*G06F 3/06* (2006.01)
*G06F 15/173* (2006.01)
*H04L 69/16* (2022.01)

(52) U.S. Cl.
CPC .......... *G06F 3/0613* (2013.01); *G06F 3/0659* (2013.01); *G06F 3/067* (2013.01); *G06F 15/17331* (2013.01); *H04L 69/16* (2013.01)

(58) Field of Classification Search
CPC ...... G06F 3/0613; G06F 3/0659; G06F 3/067; G06F 15/17331; G06F 3/0617; G06F 3/0635; G06F 3/0662; H04L 69/16
See application file for complete search history.

(56) References Cited

U.S. PATENT DOCUMENTS

| | | | |
|---|---|---|---|
| 7,493,424 B1 | 2/2009 | Bali et al. | |
| 7,769,722 B1 * | 8/2010 | Bergant | G06F 16/125 |
| | | | 707/681 |

(Continued)

OTHER PUBLICATIONS

Tian et al., "A Novel Software-based Multi-path RDMA Solution for Data Center Networks", Sep. 1, 2020, CoRR, pp. 1-8 (Year: 2020).*

(Continued)

*Primary Examiner* — Kevin L Young
*Assistant Examiner* — Jennifer Marie Gutman
(74) *Attorney, Agent, or Firm* — JAFFERY WATSON HAMILTON & DESANCTIS LLP

(57) ABSTRACT

Systems and methods are described for a cross-site high availability distributed storage system. According to one embodiment, a computer implemented method includes providing a remote direct memory access (RDMA) request for a RDMA stream, and generating, with an interconnect (IC) layer of the first storage node, multiple IC channels and associated IC requests for the RDMA request. The method further includes mapping an IC channel to a group of multiple transport layer sessions to split data traffic of the IC channel into multiple packets for the group of multiple transport layer sessions using an IC transport layer of the first storage node and assigning, with the IC transport layer, (Continued)

Storage Node 1001

FILE SYSTEM 1010 | IC LAYER 1020 | IC TRANSPORT LAYER 1030 | DEVICE DRIVER 1040

RDMA REQUEST 1012
IC REQUEST 1021
PACKET 1031
PACKET 1032
PACKET 1033
IC REQUEST 1022
IC REQUEST 1023
IC REQUEST 1024
IC REQUEST 1025
IC REQUEST 1026

SESSION 1046 | SESSION 1047

TX QUEUES 1045
QUEUE 1
QUEUE 2
QUEUE 5
QUEUE 7
QUEUE 8

Storage Node 1050

IC TRANSPORT LAYER 1070

RX QUEUES 1060
QUEUE 1
QUEUE 2
QUEUE 5
QUEUE 7
QUEUE 8

PER IC CHANNEL QUEUE 1072
PACKET 1031
PACKET 1032
PACKET 1033
REQ 1022 PKT 1034
REQ 1022 PKT 1035
REQ 1022 PKT 1036
REQ 1023 PKT 1037
REQ 1023 PKT 1038
REQ 1023 PKT 1039

MEMORY 1080

SESSION 1048

ORDERING AND QUEUING 1074 a unique transaction identification (ID) to each IC request and assigning a different data offset to each packet of a transport layer session.

20 Claims, 14 Drawing Sheets

(56)                    References Cited

U.S. PATENT DOCUMENTS

| | | | | |
|---|---|---|---|---|
| 8,745,243 | B2 | 6/2014 | Engebretson | |
| 9,389,787 | B2 | 7/2016 | McCarthy et al. | |
| 10,880,204 | B1 * | 12/2020 | Shalev | H04L 47/365 |
| 10,999,221 | B2 * | 5/2021 | Gafni | H04L 47/621 |
| 2008/0181245 | A1 * | 7/2008 | Basso | H04L 47/50 |
| | | | | 370/412 |
| 2015/0207874 | A1 * | 7/2015 | Crockett | H04L 67/1095 |
| | | | | 707/614 |
| 2018/0095915 | A1 * | 4/2018 | Prabhakar | H04L 67/1097 |
| 2020/0026616 | A1 * | 1/2020 | Hu | G06F 11/2074 |
| 2020/0274819 | A1 * | 8/2020 | Nahum | H04L 47/2441 |
| 2020/0334195 | A1 * | 10/2020 | Chen | H04L 47/34 |
| 2020/0409563 | A1 * | 12/2020 | Parasnis | G06F 3/067 |
| 2021/0014153 | A1 * | 1/2021 | Amend | H04L 69/14 |
| 2021/0135978 | A1 * | 5/2021 | Nemirovsky | H04L 45/12 |
| 2021/0152494 | A1 * | 5/2021 | Johnsen | H04L 41/12 |
| 2021/0368029 | A1 * | 11/2021 | Zhang | H04L 47/196 |
| 2022/0400069 | A1 * | 12/2022 | Xu | H04L 43/0829 |
| 2022/0400074 | A1 * | 12/2022 | Srinivasan | H04L 45/123 |
| 2025/0224879 | A1 | 7/2025 | Brown et al. | |

OTHER PUBLICATIONS

Hoff, "Software-based RoCE, A New Way to Experience RDMA", Nov. 11, 2015, Infiniband Trade Association (Year: 2015).*

"MTU and Bandwidth", May 2010, Spiceworks Community, pp. 1-2 (Year: 2010).*

Chen et al., MP-RDMA: Enabling RDMA With Multi-Path Transport in Datacenters, Nov. 11, 2019, IEEE, IEEE/ACM Transactions on Networking vol. 27, Issue 6, pp. 2308-2323 (Year: 2019).*

Behrens et al., "RDMC: A Reliable RDMA Multicast for Large Objects", Jul. 23, 2016, IEEE, 2018 48th Annual IEEE/IFIP International Conference on Dependable Systems and Networks, pp. 71-82 (Year: 2018).*

"Soft-RoCE, RDMA Transport in a software Implementation", InfiniBand Trade Association, Jun. 2015, 3 pages.

Dally, William J., "Virtual-Channel Flow Control", IEEE Transactions on Parallel and Distributed Systems, vol. 3, No. 2, Mar. 1992, pp. 194-205.

* cited by examiner

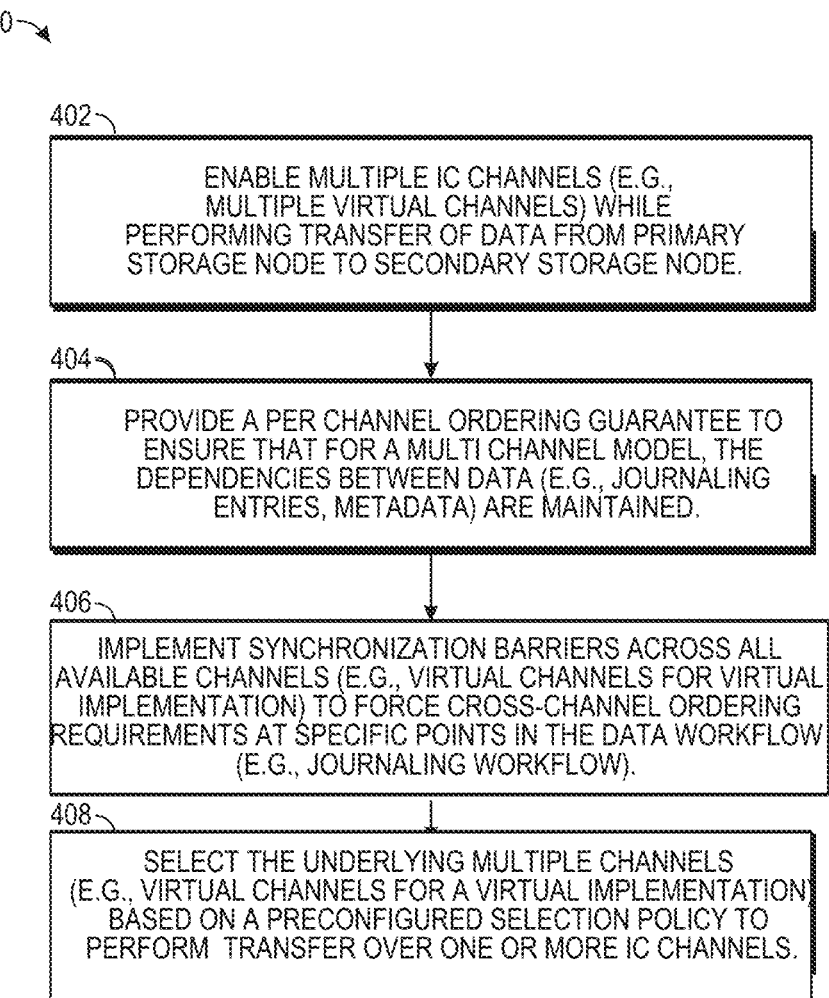

400

402
ENABLE MULTIPLE IC CHANNELS (E.G., MULTIPLE VIRTUAL CHANNELS) WHILE PERFORMING TRANSFER OF DATA FROM PRIMARY STORAGE NODE TO SECONDARY STORAGE NODE.

404
PROVIDE A PER CHANNEL ORDERING GUARANTEE TO ENSURE THAT FOR A MULTI CHANNEL MODEL, THE DEPENDENCIES BETWEEN DATA (E.G., JOURNALING ENTRIES, METADATA) ARE MAINTAINED.

406
IMPLEMENT SYNCHRONIZATION BARRIERS ACROSS ALL AVAILABLE CHANNELS (E.G., VIRTUAL CHANNELS FOR VIRTUAL IMPLEMENTATION) TO FORCE CROSS-CHANNEL ORDERING REQUIREMENTS AT SPECIFIC POINTS IN THE DATA WORKFLOW (E.G., JOURNALING WORKFLOW).

408
SELECT THE UNDERLYING MULTIPLE CHANNELS (E.G., VIRTUAL CHANNELS FOR A VIRTUAL IMPLEMENTATION BASED ON A PRECONFIGURED SELECTION POLICY TO PERFORM TRANSFER OVER ONE OR MORE IC CHANNELS.

FIG. 4

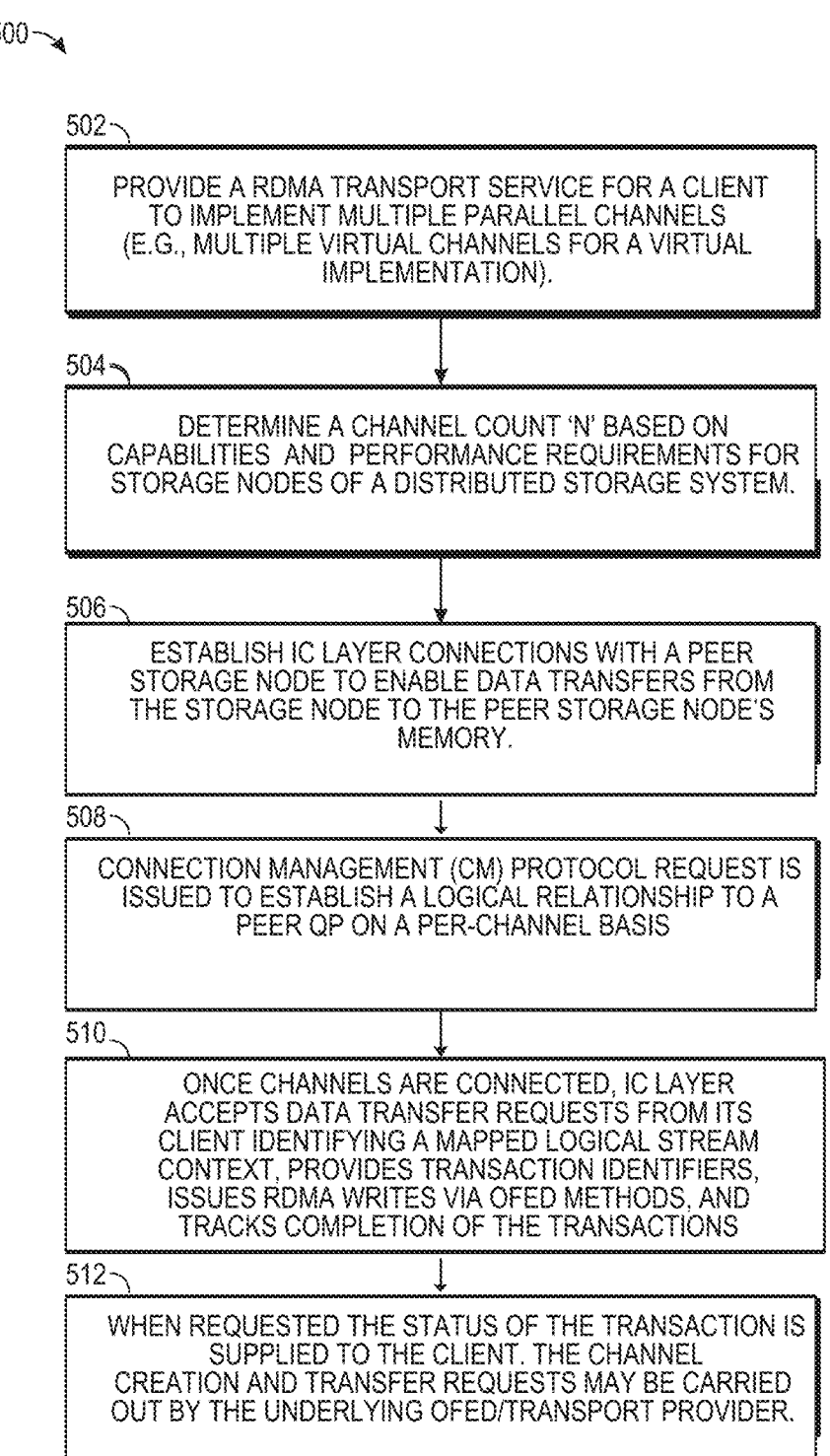

500

502

PROVIDE A RDMA TRANSPORT SERVICE FOR A CLIENT TO IMPLEMENT MULTIPLE PARALLEL CHANNELS (E.G., MULTIPLE VIRTUAL CHANNELS FOR A VIRTUAL IMPLEMENTATION).

504

DETERMINE A CHANNEL COUNT 'N' BASED ON CAPABILITIES AND PERFORMANCE REQUIREMENTS FOR STORAGE NODES OF A DISTRIBUTED STORAGE SYSTEM.

506

ESTABLISH IC LAYER CONNECTIONS WITH A PEER STORAGE NODE TO ENABLE DATA TRANSFERS FROM THE STORAGE NODE TO THE PEER STORAGE NODE'S MEMORY.

508

CONNECTION MANAGEMENT (CM) PROTOCOL REQUEST IS ISSUED TO ESTABLISH A LOGICAL RELATIONSHIP TO A PEER QP ON A PER-CHANNEL BASIS

510

ONCE CHANNELS ARE CONNECTED, IC LAYER ACCEPTS DATA TRANSFER REQUESTS FROM ITS CLIENT IDENTIFYING A MAPPED LOGICAL STREAM CONTEXT, PROVIDES TRANSACTION IDENTIFIERS, ISSUES RDMA WRITES VIA OFED METHODS, AND TRACKS COMPLETION OF THE TRANSACTIONS

512

WHEN REQUESTED THE STATUS OF THE TRANSACTION IS SUPPLIED TO THE CLIENT. THE CHANNEL CREATION AND TRANSFER REQUESTS MAY BE CARRIED OUT BY THE UNDERLYING OFED/TRANSPORT PROVIDER.

TRANSPORT LAYER IN THE IC FRAMEWORK
PROVIDES A SOFTWARE IMPLEMENTATION OF
RDMA AND USES A TRANSPORT PROTOCOL
(E.G., UDP PROTOCOL,
TCP) FOR DATA TRANSFER

604

FOR PROVIDING MULTIPLE CHANNELS TO
UPPER LAYERS OF A SOFTWARE STACK, THE
TRANSPORT LAYER CREATES A DIFFERENT
NETWORK CONNECTION FOR EACH CHANNEL

606

IN THE TRANSPORT LAYER, THE DIFFERENT
CHANNELS ARE ATTACHED TO DIFFERENT TRANSPORT
SESSIONS (E.G., UDP SESSIONS, TCP SESSIONS).

IN ONE EXAMPLE, DATA TRAFFIC OF EACH CHANNEL IS SPLIT
INTO MULTIPLE PACKETS TO BE DELIVERED WITH ONE
TRANSPORT LAYER SESSION OR A GROUP OF TRANSPORT
LAYER SESSIONS.

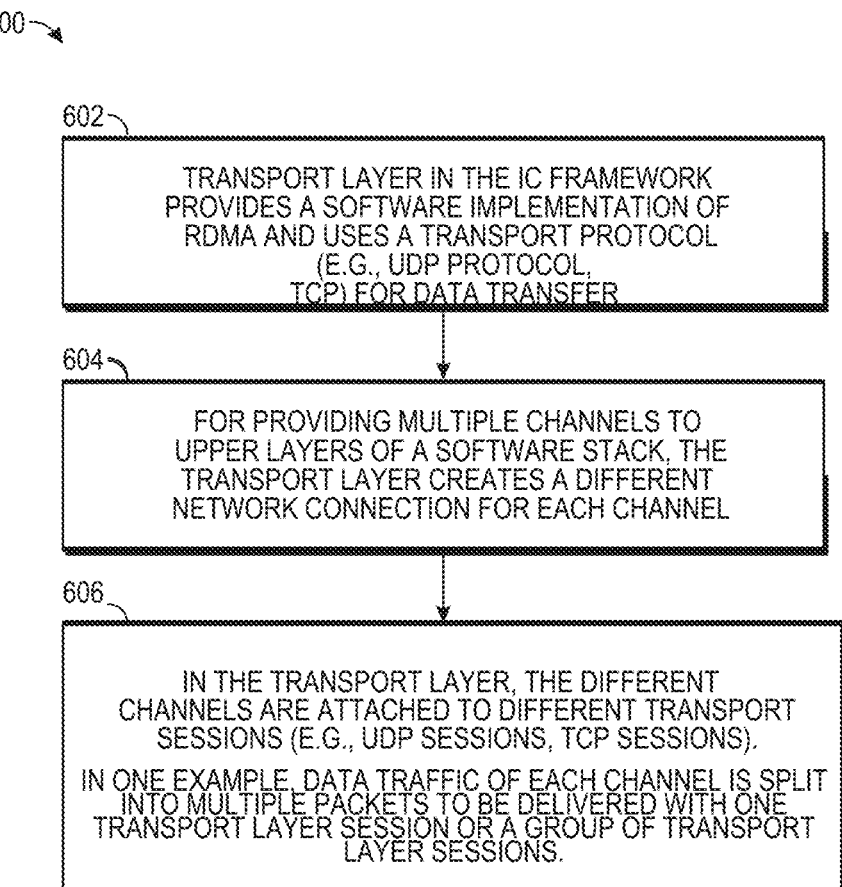

FIG. 6

CROSS-SITE HIGH-AVAILABILITY DISTRIBUTED CLOUD STORAGE SYSTEM TO PROVIDE MULTIPLE VIRTUAL CHANNELS BETWEEN STORAGE NODES

CROSS-REFERENCE TO RELATED APPLICATIONS

This application claims the benefit of U.S. Provisional Application No. 63/212,629, filed on Jun. 19, 2021, which is hereby incorporated by reference in its entirety for all purposes.

FIELD

Various embodiments of the present disclosure generally relate to multi-site distributed data storage systems. In particular, some embodiments relate to a cross-site high-availability distributed cloud storage system (e.g., cross-site high-availability (HA) storage solutions) to provide multiple virtual interconnect (IC) channels between storage nodes.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Systems and methods are described for a cross-site high-availability distributed cloud storage system (e.g., cross-site high-availability (HA) storage solutions) to provide multiple channels between storage nodes (e.g., multiple physical channels between physical storage nodes and multiple virtual channels between virtual storage nodes). According to one embodiment, a method performed by one or more processing resources of a first storage node of the distributed cloud storage system comprises providing a remote direct memory access (RDMA) request for a RDMA stream, and generating, with an interconnect (IC) layer of the first storage node, multiple IC channels and associated IC requests for the RDMA request. The method further includes mapping an IC channel to a group of multiple transport layer sessions to split data traffic of the IC channel into multiple packets for the group of multiple transport layer sessions using an IC transport layer of the first storage node, and assigning, with the IC transport layer, a unique transaction identification (ID) to each IC request and assigning a different data offset to each packet of a transport layer session.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4 is a flow diagram illustrating a set of operations of a file system layer to provide multiple flows (e.g., IC channels 215a-d, 315a-d) so that the storage nodes can better scale I/O performance (e.g., write performance) with growing compute instance capabilities in accordance with an embodiment of the present disclosure.

FIG. 5 is a flow diagram illustrating a set of operations of the IC layer to provide multiple flows (e.g., IC channels 215a-d, IC channels 315a-d, virtual channels for a virtual implementation) in accordance with an embodiment of the present disclosure.

FIG. 6 is a flow diagram illustrating a set of operations of the IC transport layer to provide multiple flows (e.g., IC channels 215a-d, 315a-d, virtual channels for a virtual implementation) in accordance with an embodiment of the present disclosure.

DETAILED DESCRIPTION

Figure 1:
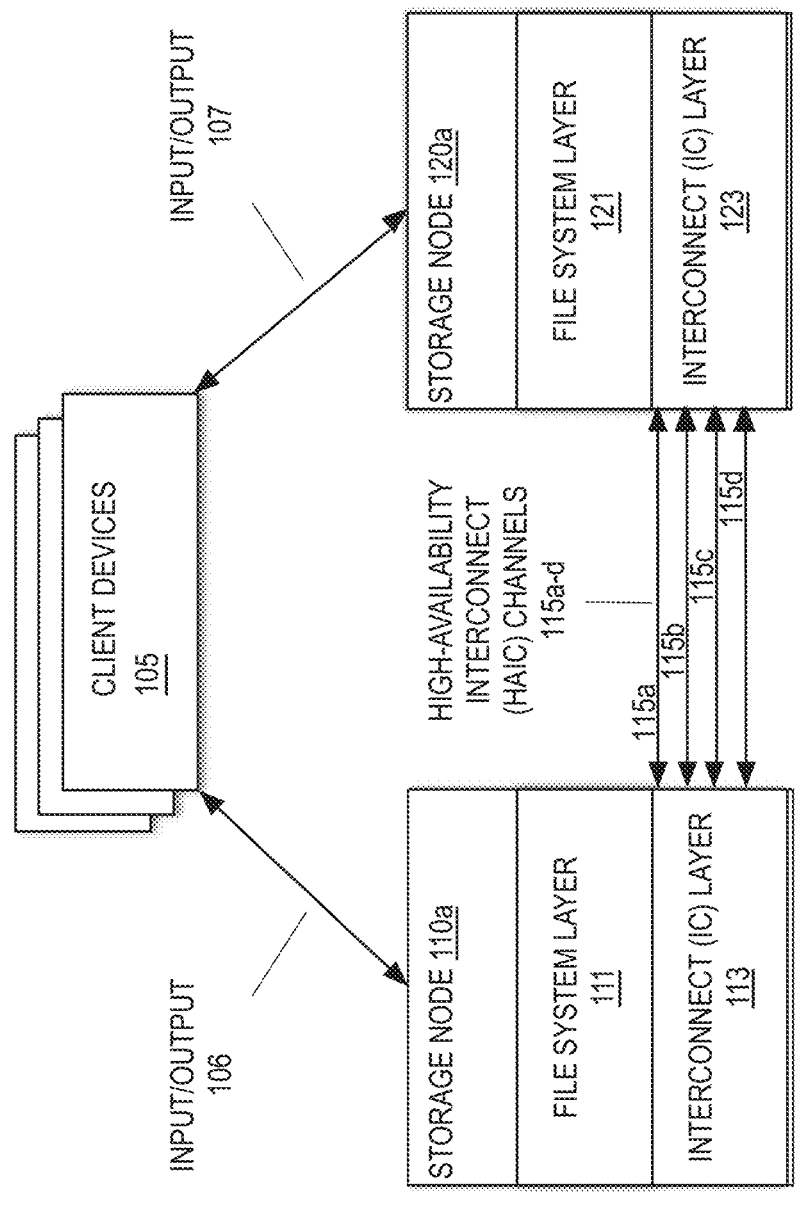
FIG. 1 is a block diagram illustrating an environment 100 in which various embodiments may be implemented.

Systems and methods are described for a cross-site high-availability distributed cloud storage system (e.g., cross-site high-availability (HA) storage solutions) to provide multiple interconnect (IC) channels (e.g., multiple virtual channels for a virtual implementation) between storage nodes for improved performance According to one embodiment, a method performed by one or more processing resources of a first storage node of the distributed cloud storage system comprises generating, with a first storage node, a remote direct memory access (RDMA) stream with the RDMA stream having multiple RDMA requests. The method further includes generating, with an interconnect (IC) layer of the first storage node, multiple IC channels and associated IC requests for the RDMA request, splitting data traffic of each IC channel into multiple transport layer sessions using an IC transport layer of the first storage node and assigning, with the IC transport layer, a unique transaction identification (ID) to each IC request and assigning a different data offset to each packet of a transport layer session in order to enable reordering of packets and IC requests at a remote second storage node.

This method enables a data transfer (e.g., replicate copies of journal log of client data transfer requests) of a client device from the first storage node to the remote second storage node. These multiple virtual IC channels can be aggregated to provide high bandwidth, low latency transport medium for environments (e.g., typically hyperscalers/cloud service providers) that limit/cap the performance of individual virtual IC channel. This aggregation leads to improvement of the overall performance delivered by the storage cluster.

A storage server such as a storage node of a primary storage site can be used to backup critical data, among other purposes. A data backup technique known as "mirroring" involves backing up data stored at a primary site by replicating an exact copy (a mirror image) of the data at a remote secondary site. If data is ever lost at the primary storage site, it can be recovered from the secondary storage site.

The primary storage site receives and responds to various read and write requests from client devices. In a system which handles large volumes of client requests, it may be impractical to commit data modification requests to the mass backend storage devices connected to the storage nodes every time a data modification request is received from a client because backend storage device/disk accesses tend to take a relatively long time compared to in-memory operations. Therefore, the primary storage site may instead hold write requests in memory temporarily and only periodically save the modified data to the mass storage devices, such as every few seconds. The event of saving the modified data to the mass storage devices is called a consistency point. At a consistency point, the primary storage site saves any data that was modified by the write requests to its local mass storage devices and triggers a process of updating the data stored at the mirror secondary storage site to reflect an updated primary volume at the primary storage site.

In this approach, there is a small risk of a system failure occurring between consistency points, causing the loss of data modified after the last consistency point. Consequently, in at least one approach, the primary storage site includes a non-volatile random access memory (NVRAM) in which NV memory maintains a journal log of data modification requests received from clients since the last consistency point. The journal log includes a separate entry for each data modification request received from a client since the last consistency point. Each log entry comprises of the data modification requests as received from the storage client including the new data required to be committed to the storage. The log is only used in the event of a failure, to recover and commit the data since the last consistency point that would otherwise be lost. In the event of a failure, it may be possible to replay the log to reconstruct the state of stored data to recover from the failure. In one example, after each consistency point is completed, the log holding entries committed as part of last consistency point is discarded and a new log is started.

To protect against a failure of the primary storage site (including journal log), an approach called clustered failover (CFO) is used in which the primary and the secondary storage sites operate as "high availability partners' and are connected with a single interconnect channel that mirrors the log entries across the "high-availability" partners. In the event of failure of a node, its high-availability partner replays the log from its copy to reconstruct an up-to-date version of the stored data. Therefore, it is important that this log be replicated to its HA partner and is always up to date across all its copies. This also implies that any incoming data-modification request be committed (via IC) across all copies of the log before the data-modification request is acknowledged back to the client. The single interconnect (IC) channel often has a limited bandwidth (especially in a cloud environment) and can become a performance bottleneck in case of a high-availability storage workflow. The write performance for a storage node cannot be scaled even if the storage node executes with larger compute instances in a cloud environment.

Embodiments described herein seek to improve various technological processes associated with cross-site storage solutions and overcome network bandwidth limitations for an IC channel (especially in a cloud like environment that typically limits the single flow/channel bandwidth) used to replicate client data requests (e.g., data modification requests) between primary and secondary storage sites. Various embodiments of the present technology provide for a wide range of technical effects, advantages, and/or improvements to stretched storage systems and participating distributed storage systems. For example, various embodiments may include one or more of the following technical effects, advantages, and/or improvements: (i) improve throughput and reduce latency for data transfers between primary storage nodes and mirrored secondary storage nodes for private or public cloud environments, typically with no hardware accelerator being available for a storage node in virtual or cloud environments, (ii) provide multiple channels and then splitting data traffic of each channel into multiple packets delivered by a transport layer session or a group of multiple transport layer sessions (e.g., UDP sessions, TCP sessions) between the primary and secondary storage nodes to overcome network bandwidth limitations, (iii) maintain data consistency at a proper data order, (iv) distribute workloads across processing resources to minimize latency for client devices, and (v) coordinate between different software layers of a software stack of a storage node. One or more of which may include various additional optimizations described further below.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, multiple storage nodes (e.g., storage nodes 110*a* and 120*a*) may be part of a storage solution providing high availability (HA) and/or disaster recovery (DR) in which the storage nodes reside in different fault domains (e.g., power and/or networking failure domains) and/or in different regions (e.g., geographically distributed data centers, private or public cloud provider availability zones). Depending upon the particular implementation, one or both of the storage nodes may be represented in physical or virtual form. Non-limiting examples of storage nodes in physical form include network storage systems or appliances that are capable of supporting one or both of Network Attached Storage (NAS) and Storage-Area Network (SAN) accessibility from a single storage pool, which may be referred to as Fabric Attached Storage (FAS). A storage node represented in virtual form having an operating system that includes a software stack (e.g., file system layer, an interconnect (IC) layer, an IC transport layer, device driver) may be implemented as a virtual machine (VM) or container within a private or public cloud (e.g., cloud service provider). A system memory of the VM or container can store data (e.g., NV data, NV log data).

The storage nodes may represent special purpose nodes operable to provide file services relating to the organization of information on storage devices associated with the storage nodes. A non-limiting example of such special purpose node includes a "filer," which may represent a high-performance all flash FAS (AFF) storage array scalable to terabytes of data that presents storage over the network using various protocols (e.g., Internet small computer system interface (iSCSI), Fibre Channel (FC), common Internet file system (CIFS), network file system (NFS), hypertext transfer protocol (HTTP), web-based distributed authoring and versioning (WebDAV)) or a custom protocol. The "filer" may be configured to operate according to a client/server model of information delivery to thereby allow many clients devices 105 to access files stored on a server, e.g., the filer. In this model, the client may comprise an application, such as a database application, executing on a computer that "connects" to the filer over a computer network, such as a point-to-point channel, shared local area network (LAN), wide area network (WAN), or virtual private network (VPN) implemented over a public network, such as the Internet. The clients may request services of a storage node by issuing Input/Output requests 106 or 107 (e.g., file system protocol messages (in the form of packets) over the network).

The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

In the context of the present example, storage node 110*a* has an operating system that includes a file system layer 111 and an interconnect (IC) layer 113. The IC layer 113 may optionally include an IC transport layer, which can be a software implementation of Remote Direct Memory Access (RDMA) and also a device driver. In computing, remote direct memory access (RDMA) is a direct memory access from the memory of one computer into that of another without involving either one's operating system. RDMA is a hardware mechanism through which the device driver (e.g., device driver for a network interface card (NIC)) can directly access all or parts of the main memory of a remote node without involving the processor. File system layer 111 may be a "write in-place" file system (e.g., the Berkeley fast file system) or a write-anywhere file system (e.g., the Write Anywhere File Layout (WAFL) file system available from NetApp, Inc. of San Jose, CA). The IC layer 113 provides an application programming interface (API) to upstream and downstream layers and abstracts the implementation of certain functionality performed on behalf of the file system layer 111. For example, the IC layer 113 may allow the storage node to check whether an HA or DR partner is functioning and/or to mirror log data to and/or from the other's nonvolatile memory via one or more high-availability interconnect (HAIC) channels 115*a-d* (e.g., 2 to 8 HAIC channels), which can be virtual channels for a virtual storage node implementation. According to one embodiment, the IC layer 113 makes use of an IC transport layer to encapsulate RDMA frames within Ethernet packets for transmission via the HAIC channel 115*a-d*. The functionality of file system layer 121 and IC layer 123 of storage node 120a generally correspond to their respective counterparts in storage node 110a.

Depending upon the particular configuration, storage requests (e.g., Input/Output requests 106 and 107) may be directed to data stored on storage devices associated with one of the storage nodes. As described further below, certain types of storage requests may be logged (e.g., in the form of journal entries) to non-volatile random access memory (NVRAM) or local VM memory, as the case may be, and mirrored to the other storage node, which may represent an HA partner or a DR partner. Similarly, the data associated with the storage request may be synchronously, semi-synchronously, or asynchronously replicated to maintain consistency between datasets of the storage nodes to support continuous availability, for example, by failing over from one storage node to the other should one of the storage nodes become inaccessible to the client devices 105 for some reason.

While in the context of the present example, only two storage nodes are shown, it is to be appreciated storage nodes 110a and/or 120a may be part of a cluster of local and/or remote storage nodes depending upon the particular configuration. As such, a storage node may have more than one HA or DR partner in the same or a different data center or private or public cloud availability zone. The storage nodes 110a and 120a may be physical or virtual storage nodes.

While in the context of the present example, 4 channels (e.g., HAIC channels 115a-d) are shown for mirroring of data from storage node 110a to storage node 120a. It is to be noted, due to differences in the level of importance of efficiency and timely completion of data transfers and/or depending upon the particular implementation, mirroring of log data to an HA partner and the mirroring of log data to a DR partner may use different channels. For example, mirroring between or among HA partners may make use of the HAIC channels 115a-d, whereas mirroring to a DR partner may be via a different network channel (not shown).

Figure 2:
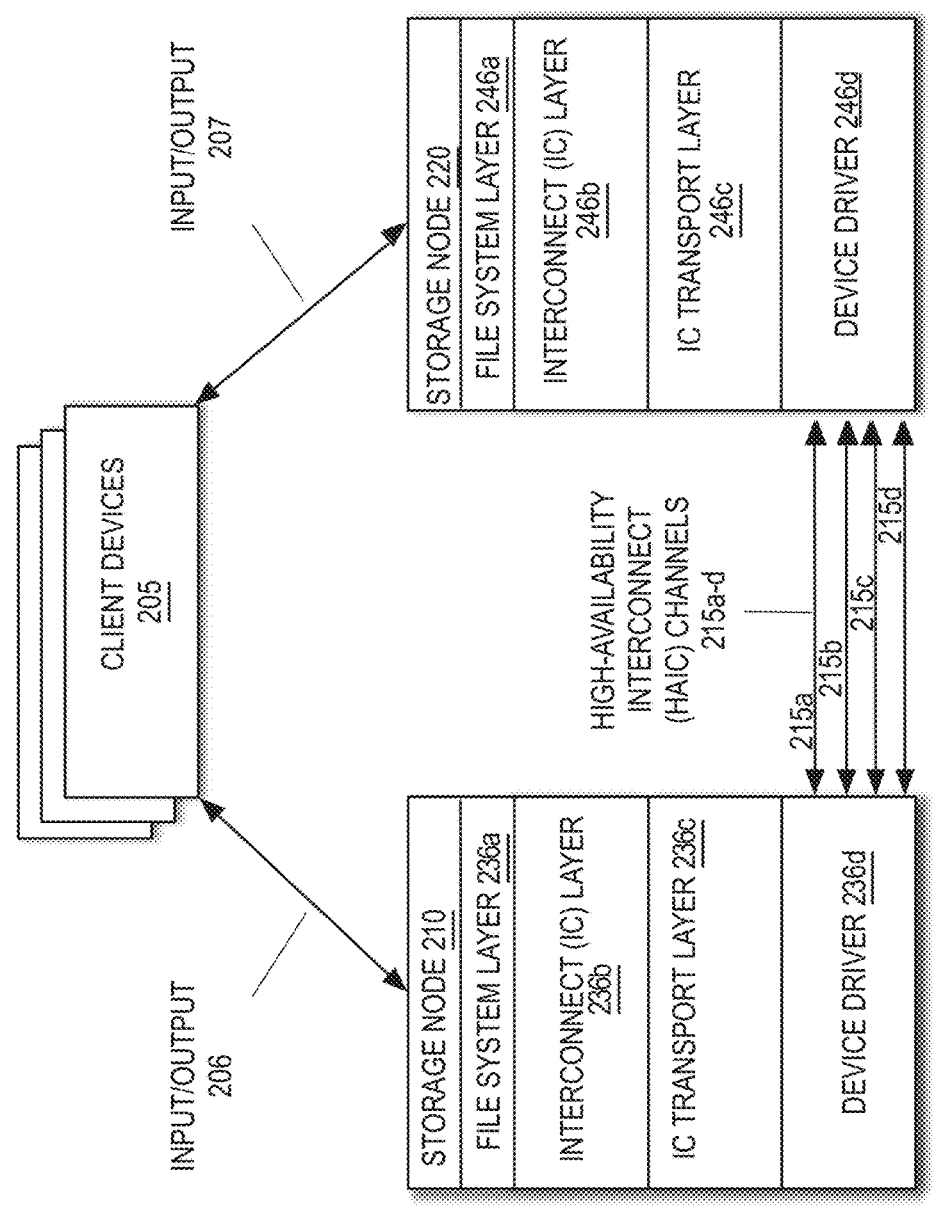
FIG. 2 is a block diagram illustrating a cross-site high-availability distributed cloud storage system to provide multiple communication channels between storage nodes.

FIG. 2 is a block diagram illustrating a cross-site high-availability distributed cloud storage system to provide multiple communication channels between storage nodes. In various examples described herein, users of client devices 205 of a multi-site distributed cloud storage system 200 having storage nodes 210 and 220 provide input/output requests 206 to storage node 210 and input/output requests 207 to storage node 220 via a browser-based interface presented on client devices 205.

In the context of the present example, the multi-site distributed cloud storage system 200 includes a storage node 210, a storage node 220, and interconnect (IC) channels 215a, 215b, 215c, and 215d. Additional or fewer IC channels can be supported (e.g., 2-8 channels). The storage nodes are coupled in communication via the IC channels 215a-d, which, depending upon the particular implementation, may be part of a Local Area Network (LAN), a Wide Area Network (WAN), or the Internet. The storage nodes can be virtual storage nodes 210 and 220 if implemented as a virtual machine (VM) or container within a private or public cloud.

Turning now to the storage node 210 (or virtual storage node 210), it includes an operating system having multiple software layers including a file system layer 236a, an IC layer 236b, an IC transport layer 236c, a device driver 236d (e.g., storage driver, network interface card (NIC) driver). Application Programming Interfaces (API) may allow communications to or between these layers. In the context of the present example, the multiple storage nodes 210 and 220 are organized as a cluster and provide a distributed storage architecture to service storage requests 206 and 207 issued by one or more client devices or computer systems of the users. The data served by the storage nodes may be distributed across multiple storage units embodied as persistent storage devices (e.g., non-volatile memory), including but not limited to HDDs, SSDs, flash memory systems, or other storage devices. In a similar manner, storage node 220 includes an operating system with multiple software layers including a file system layer 246a, an IC layer 246b, an IC transport layer 246c, and a device driver 246d. For a virtual implementation of storage nodes 210 and 220, the data can be stored in persistent storage devices or memory of one or more virtual machines.

While for sake of brevity, only two storage nodes are shown in the context of the present example, it is to be appreciated that additional storage nodes or clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

For any data modifying operation of an I/O request from a client device, a storage node 210 journals the operation locally in an Op log that can be stored locally and then the operation is mirrored across a channel (or virtual channel) to the storage node 220 before the storage node 210 can acknowledge back to the client device 205. After the acknowledgement back to the client device 205, then the operation entered into the Op log can be committed to storage devices for the storage nodes.

Two copies of data are desired for high-availability and also to eliminate a single-point-of-failure causing a loss of data or access to data. If a journaling operation can complete faster, then this improves the I/O per second (IOPS) number and lowers the latency experienced by the user(s) of the client devices. In other words, efficient journaling operations results in better performance by the storage nodes 210 and 220.

In case of hardware based HA storage node pairs, interconnect (IC) bandwidth is not a limiting factor due to the high-bandwidth/low-latency technologies being used (e.g., RDMA over Converged Ethernet (RoCE)/RDMA/iWARP). However, in case of a typical cloud infrastructure or virtual environment, these specialized interconnect technologies are rarely available. Therefore, interconnect functionality is typically realized over TCP/UDP based virtual connections.

In an ideal world, storage node pairs running on larger compute instances in a cloud storage system should be able to provide better performance In other words, the performance should scale along with the capabilities of the underlying cloud compute instance for the storage node pairs. As part of a cloud service provider offering for storage nodes in HA mode, larger compute instance types are being made available and at the same time higher performance requirements are being imposed. Even though, these larger compute instances support higher "aggregated" network throughput capabilities, the storage node pairs may be unable to make full use of higher network throughput capabilities.

The biggest performance bottleneck can be the interconnect bandwidth between the two storage nodes (i.e., inter-instance network bandwidth). A cloud service provider may enforce maximum network throughput limits on a per flow basis, where "flow" can be thought of as a single point-topoint network connection usually based on UDP or TCP. So even though the larger compute instances can support higher "aggregated" network bandwidth, any single flow can only scale up to a certain inter-instance bandwidth (e.g., 1-10 Gb/sec) for the configurations that the HA storage node pairs support.

The present design has enhanced capabilities of a software stack (e.g., a file system layer 111, an IC layer 113; a file system layer 121, an IC layer 123; a file system layer 236a, an IC layer 236b, an IC transport layer 236c, a device driver 236d; a file system layer 246a, an IC layer 246b, an IC transport layer 246c, a device driver 246d; a file system layer 336a, an IC layer 336b, an IC transport layer 336c, a device driver 336d; a file system layer 346a, an IC layer 346b, an IC transport layer 346c, a device driver 346d) to provide multiple flows (e.g., IC channels 115a-d, IC channels 215a-d, IC channels 315a-d) with an IC transport layer being able to split data traffic of each IC channel into multiple packets delivered by one transport layer session or a group of multiple transport layer sessions so that the storage nodes (or virtual storage nodes) can better scale I/O performance (e.g., write performance) with growing compute instance capabilities.

The largest consumer of IC bandwidth within the software layers of the storage nodes can be the file system layer. To enable the file system layer to distribute its I/O traffic (e.g., write traffic for persistent storage) across multiple parallel IC channels, the IC layer, IC transport layer, and device driver coordinate multiple (virtual) parallel channels for the file system's consumption to avoid a cloud service provider limitation of single flow while transferring journal log entries from a first storage node (e.g., storage node 110a, 210, 310) to a peered storage node (e.g., storage node 120a, 220, 320).

Figure 3:
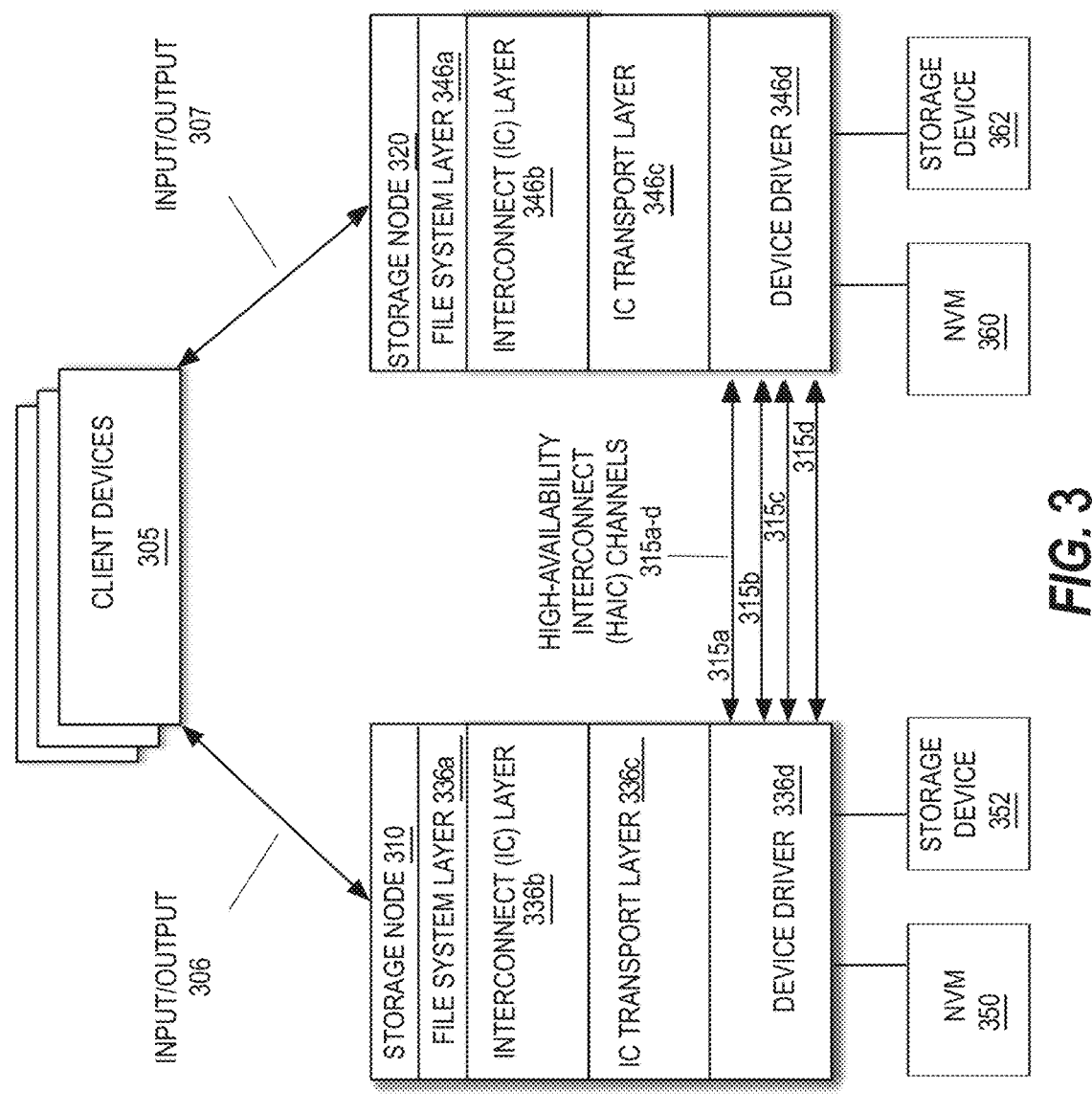
FIG. 3 is a block diagram illustrating a cross-site high-availability distributed cloud storage system to provide multiple communication channels between storage nodes in accordance with another embodiment.

FIG. 3 is a block diagram illustrating a cross-site high-availability distributed cloud storage system to provide multiple communication channels between storage nodes in accordance with another embodiment. In various examples described herein, users of client devices 305 of a multi-site distributed cloud storage system 300 having storage nodes 310 and 320 provide input/output requests 306 to storage node 310 and input/output requests 307 to storage node 320 via a browser-based interface presented on client devices 305.

In the context of the present example, the multi-site distributed cloud storage system 300 includes a storage node 310, a storage node 320, and interconnect (IC) channels 315a, 315b, 315c, and 315d. Additional or fewer IC channels can be supported (e.g., 2-8 channels). The storage nodes are coupled in communication via the IC channels 315a-d, which, depending upon the particular implementation, may be part of a Local Area Network (LAN), a Wide Area Network (WAN), or the Internet.

Turning now to the storage node 310, it includes an operating system with multiple software layers including a file system layer 336a; an IC layer 336b to define IC channels, provide RDMA transport services and correlate RDMA requests to IC channels; an IC transport layer 336c to split data traffic of each IC channel into multiple packets handled by one transport layer session or a group of multiple transport layer sessions; and a device driver 336d (e.g., storage driver, network interface card (NIC) driver). Application Programming Interfaces (API) may allow communications to or between these layers. In the context of the present example, the multiple storage nodes 310 and 320 are organized as a cluster and provide a distributed storage architecture to service storage requests 306 and 307 issued by one or more client devices or computer systems of the users. The data served by the storage nodes may be distributed across multiple storage units embodied as persistent storage devices (e.g., non-volatile memory 350, 360), including but not limited to HDDs, SSDs, flash memory systems, or other storage devices (e.g., 352, 362). In a similar manner, storage node 320 includes an operating system with multiple software layers including a file system layer 346a, an IC layer 346b, an IC transport layer 346c, and a device driver 346d.

In one example, a first portion of NVM 350 stores data for the storage node 310 and a second portion of NVM 350 stores mirrored data from the storage node 320. In a similar manner, a first portion of NVM 360 stores data for the storage node 320 and a second portion of NVM 360 stores mirrored data from the storage node 310. If storage node 310 or any communication channels between the storage nodes has a failure, then the second portion of NVM 360 provides a backup copy of data for the storage node 310. If storage node 320 or any communication channels between the storage nodes has a failure, then the second portion of NVM 350 provides a backup copy of data for the storage node 320.

FIG. 4 is a flow diagram illustrating a set of operations of a file system layer to provide multiple channels (e.g., IC channels 115a-d, IC channels 215a-d, 315a-d) so that the storage nodes can better scale I/O performance (e.g., write performance) with growing compute instance capabilities in accordance with an embodiment of the present disclosure. In the context of the present example, it is assumed a peered pair of storage nodes, including a local storage node (e.g., storage node 110a, storage node 210, storage node 310) of a distributed cloud storage system and a peered remote storage node (e.g., storage node 120a, storage node 220, storage node 320). One of the volumes of the local storage node may have a failure and have an out of sync (OOS) state for a period of time. Depending upon the nature of the data replication being performed (e.g., asynchronous or synchronous) and the particular implementation, a resynchronization may be performed responsive to any volume having OOS state.

At operation 402, computer implemented method 400 may enable a file system layer to be capable of using multiple IC channels (e.g., multiple virtual channels for virtual implementation) while performing transfer of data (e.g., replication of journal log of incoming storage request, transfer of metadata) from the primary storage node to the secondary storage node over one or more IC channels (e g, channels 115a-d, channels 215a-d, channels 315a-d, multiple virtual channels for virtual implementation). At operation 404, the file system layer provides a per channel ordering guarantee to ensure that for a concurrent multi-channel model, the ordering dependencies between data (e.g., journal log entries and their metadata) across multiple channels are maintained when transfers occur in parallel. This per channel ordering guarantee is required to make sure that entries are not transferred out of order and potentially causing possible corruption of a journal log.

At operation 406, the file system also implements synchronization barriers across all available channels (e.g., virtual channels for virtual implementation) to force cross-channel ordering requirements at specific points in the data workflow (e.g., journaling workflow). At operation 408, the file system selects the underlying multiple channels (e.g., virtual channels for a virtual implementation) based on a preconfigured selection policy (e.g., round-robin style, load balancing, high or low priority channel, least frequently used channel, hybrid policy of 2 or more other selection policies, etc.) to perform transfer over one or more IC channels. To enforce ordering requirements, the file system forces dependent transfers to go over the same channel.

The file system layer executes read and write operations on storage devices in response to client requests and maintains directories of stored data.

High-Availability Interconnect

FIG. 5 is a flow diagram illustrating a set of operations of the IC layer to provide multiple channels (e.g., IC channels 215a-d, IC channels 315a-d, virtual channels for a virtual implementation, IC channels 721-724, IC channels 821-824) in accordance with an embodiment of the present disclosure. At operation 502, the Interconnect (IC) layer provides a Remote Direct Memory Access (RDMA) transport service for a client (e.g., a file system layer) to implement multiple parallel channels (e.g., multiple virtual channels, or parallel channels for a virtual implementation). At operation 504, the computer implemented method determines a channel count 'N' per storage node based on multiple factors like capabilities (e.g., capabilities of processing resources or CPUs, memory capability, disk storage, I/O ops) including network bandwidth (e.g., 10 Gb/s, 20 Gb/s, 100 Gb/s) and performance requirements for storage nodes of a distributed storage system. In one example, if a storage node and a peered storage node have different determined channel count, then the nodes negotiate to a lower channel count among the storage node and the peered storage node. Once the channel or channel count is determined, IC layer connections are established from the storage node to the peer storage node to enable data transfers (e.g., journal log entry transfers) from the local node to the peer node's memory (e.g., non-volatile (NV) memory, system memory of virtual machine) at operation 506. In one example, NV memory addresses of the peer storage node are exchanged with the local node during the connection process. The peer node identification is a configuration item and the connection starts upon exchange of Network Advertisement Protocol (NAP) messages.

In one example, the channels (e.g., virtual channels for virtual implementation) are connected via OpenFabric Enterprise Distribution (OFED) semantics where a channel is carried out by creating a Queue Pair (QP) on both local storage node and peered storage node. A QP contains a send queue and a receive queue for RDMA operations, where the send queue sends outbound messages to the peered node, and the receive queue of the local storage node receives messages from the peered node. At operation 508, a connection management (CM) protocol request is issued to establish a logical relationship to a peer QP on a per channel basis. In one example, the logical relationship with a peer node forms a virtual IC channel for a desired number of such connections. Each IC channel is mapped to an independent QP with ordering guarantees applicable only within the channel.

The client device uses logical stream contexts to map client transfer requests to underlying channel. There is one mapping per logical stream using a channel round robin scheme. More than one logical stream may be mapped to the same channel.

Once channels are connected, at operation 510, the IC layer accepts data transfer requests from its client (e.g., the file system layer) identifying a mapped logical stream context, provides transaction identifiers, issues RDMA Writes via OFED methods, and tracks the completion of the transactions. At operation 512, when requested the status of the transaction is supplied to the IC client (e.g., file system layer). The channel creation and transfer requests may be carried out by the underlying OFED/transport provider.

IC Transport

FIG. 6 is a flow diagram illustrating a set of operations of the IC transport layer to provide multiple flows (e.g., IC channels 215a-d, 315a-d, virtual channels for a virtual implementation, IC channels 721-724, IC channels 821-824) in accordance with an embodiment of the present disclosure. At operation 602, a transport layer in the IC framework provides a software implementation of RDMA and uses a transport protocol (e.g., user datagram protocol (UDP, TCP)) for data transfer. Some cloud providers limit the maximum bandwidth for a single network connection. For providing multiple channels to upper layers of a software stack, the IC transport layer creates a different network connection for each channel at operation 604. In the transport layer, at operation 606, the different channels are attached to different transport sessions (e.g., UDP sessions, TCP sessions). In one example, the data traffic of each channel is split into multiple packets to be delivered with one transport layer session or a group of multiple transport layer sessions (e.g., UDP sessions, TCP sessions). A UDP packet includes a header and data section. The header includes a source port number, a destination port number, a length in bytes of the UDP header and UDP data, and a checksum field. UDP is an unreliable protocol. UDP does not have flow control, nor does it provide mechanisms to handle packet loss or sort out-of-order packets on the receive side. However, all these missing features in UDP are provided in the IC transport layer based on assigning unique transaction identifiers to each IC request for a channel and providing a data offset for different packets in a transport session to guarantee reliable transmission.

The numbering of the operations presented is for the sake of clarity and is not intended to prescribe an order of operations in which the various operations must occur. Additionally, operations from the various flow diagrams may be utilized in a variety of combinations (e.g., combining operations 506 and 508).

Figure 7:
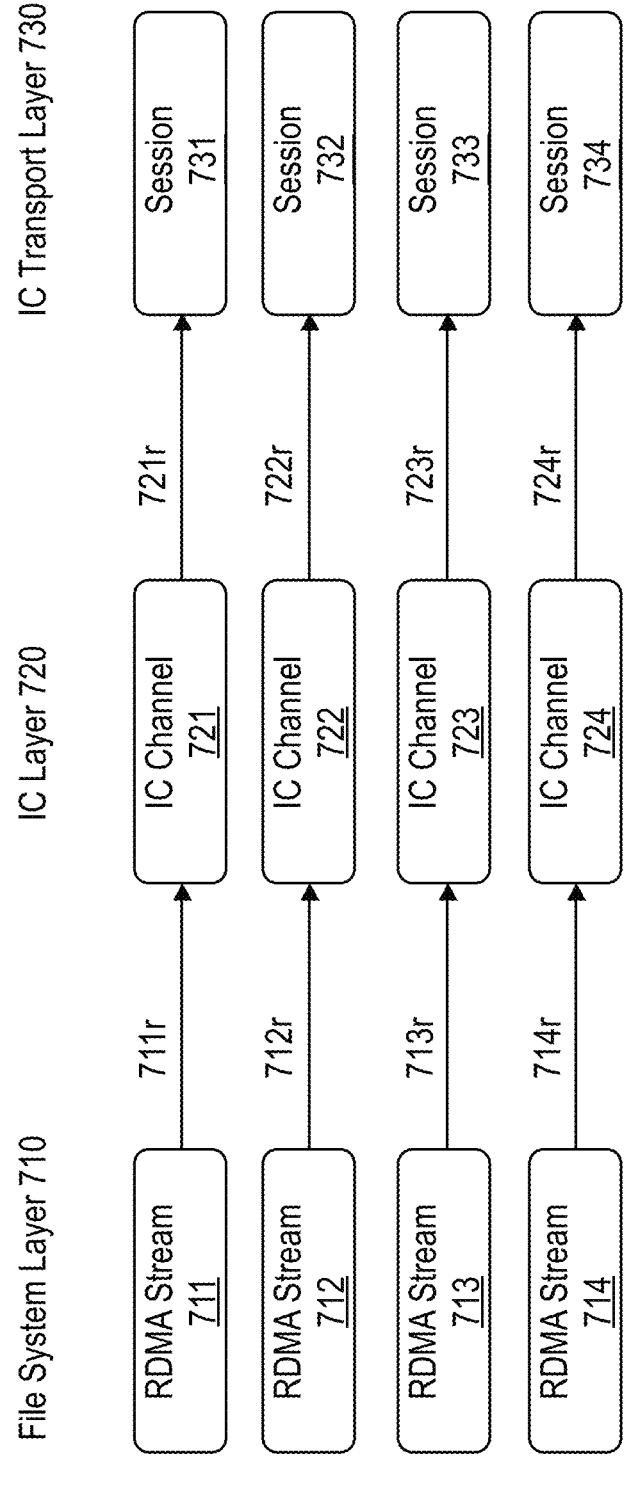
FIG. 7 illustrates a one to one mapping of an IC channel to an IC transport session of a software stack of a storage node in accordance with one embodiment.

FIG. 7 illustrates a one to one mapping of an IC channel to an IC transport session of a software stack of a storage node in accordance with one embodiment. A file system layer 710 can generate multiple RDMA streams 711-714 for a single IP source address or channel Each RDMA stream handles RDMA requests (e.g., RDMA requests 711r-714r) that are sent to the IC layer 720. The IC transport layer 730 provides flow control and mechanisms to handle packet loss or sort out-of-order packets on the receive side. In one example, a one to one mapping exists between each IC channel 721-724 and sessions 731-734 (e.g., UDP sessions 731-734) respectively. UDP sessions, or alternatively TCP, can be used for data transfer from the storage node to a remote peer storage node. These multiple IC channels and attached UDP sessions can be aggregated to provide high bandwidth, low latency transport medium for environments (e.g., hyperscalers, cloud service providers) that limit or cap the performance of individual IC channels. This aggregation leads to improvement of the overall performance delivered by the storage cluster.

On high-end storage systems, many more traffic flows (e.g., more than 4 UDP sessions or TCP connections as shown in FIG. 7) are needed in order to fully utilize the system network bandwidth. A traffic flow can be a TCP connection or a UDP session. A session is a state of information exchange. A connection may have multiple sessions. For example, if a cloud provider imposes a 5 Gbits/second(s) limit for each traffic flow, at least 10 traffic flows are required to maximize the throughput for 50 Gbits/s network bandwidth, and at least 20 traffic flows for 100 Gbits/s network bandwidth. The actual count of traffic flow is larger than the theoretical number. In other words, 11 or 12 traffic flows may be needed to maximize the throughput for 50 Gbits/s network bandwidth.

Figure 8:
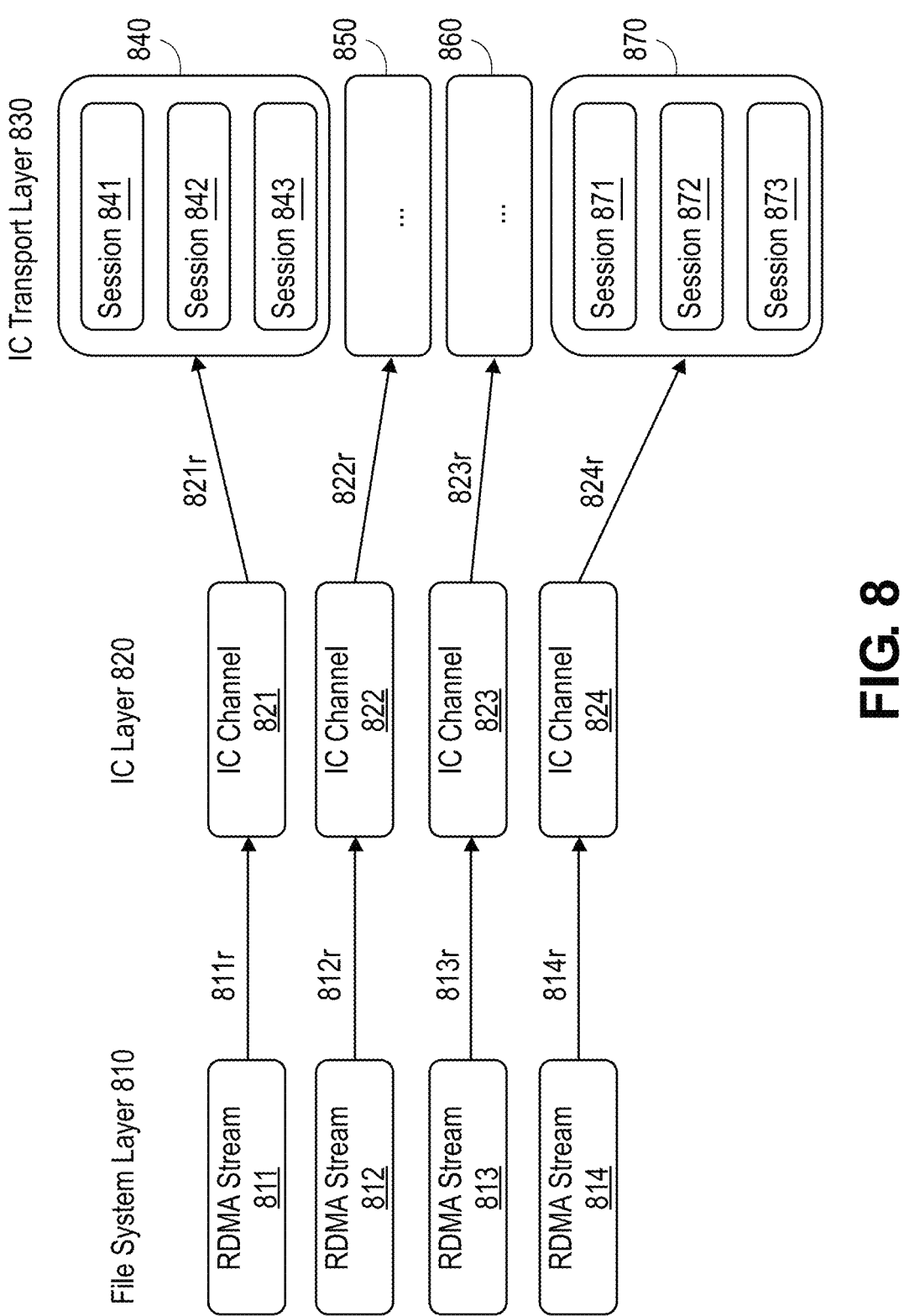
FIG. 8 illustrates an expansion of the IC transport layer to support one to many mapping in accordance with one embodiment.

Increasing a number of IC channels at the IC layer and a number of RDMA streams at the File System layer is non-trivial work when the number reaches a defined limit. Instead of making changes to the IC and File System layers, the IC transport layer is expanded to support one to many mapping as illustrated in FIG. 8 in accordance with one embodiment. A file system layer 810 can have multiple RDMA streams 811-814 for one or more IP source addresses. Each RDMA stream handles a large number of RDMA requests 811r-814r that are sent to an IC channel of the IC layer 820. Each IC channel 821-824 sends IC requests 821r-824r to an IC transport layer 830. The one to many mapping of a RDMA stream or an IC channel to a group of multiple transport layer sessions (e.g., UDP sessions, TCP sessions) splits the data traffic of each IC channel 821-824 to multiple packets that are processed by a group of transport layer sessions (e.g., UDP sessions, TCP session). The IC transport layer 830 is mapped to different groups 840, 850, 860, and 870 of transport layer sessions (e.g., 841-843, 871-873). In one example, each group of transport layer sessions (e.g., UDP sessions, TCP sessions) includes 3 transport layer sessions in order to have a total of 12 transport layer sessions for the IC channels 821-824 and this increases network throughput between the storage node of FIG. 8 and the other destination storage node. Using the 5 Gbits/second limit for each traffic flow (transport layer session) example above, instead of the 20 Gbits/second limit of FIG. 7 for four transport layer sessions, the use of the groups of transport layer sessions increases the limit to 60 Gbits/second for twelve transport layer sessions.

Figure 9:
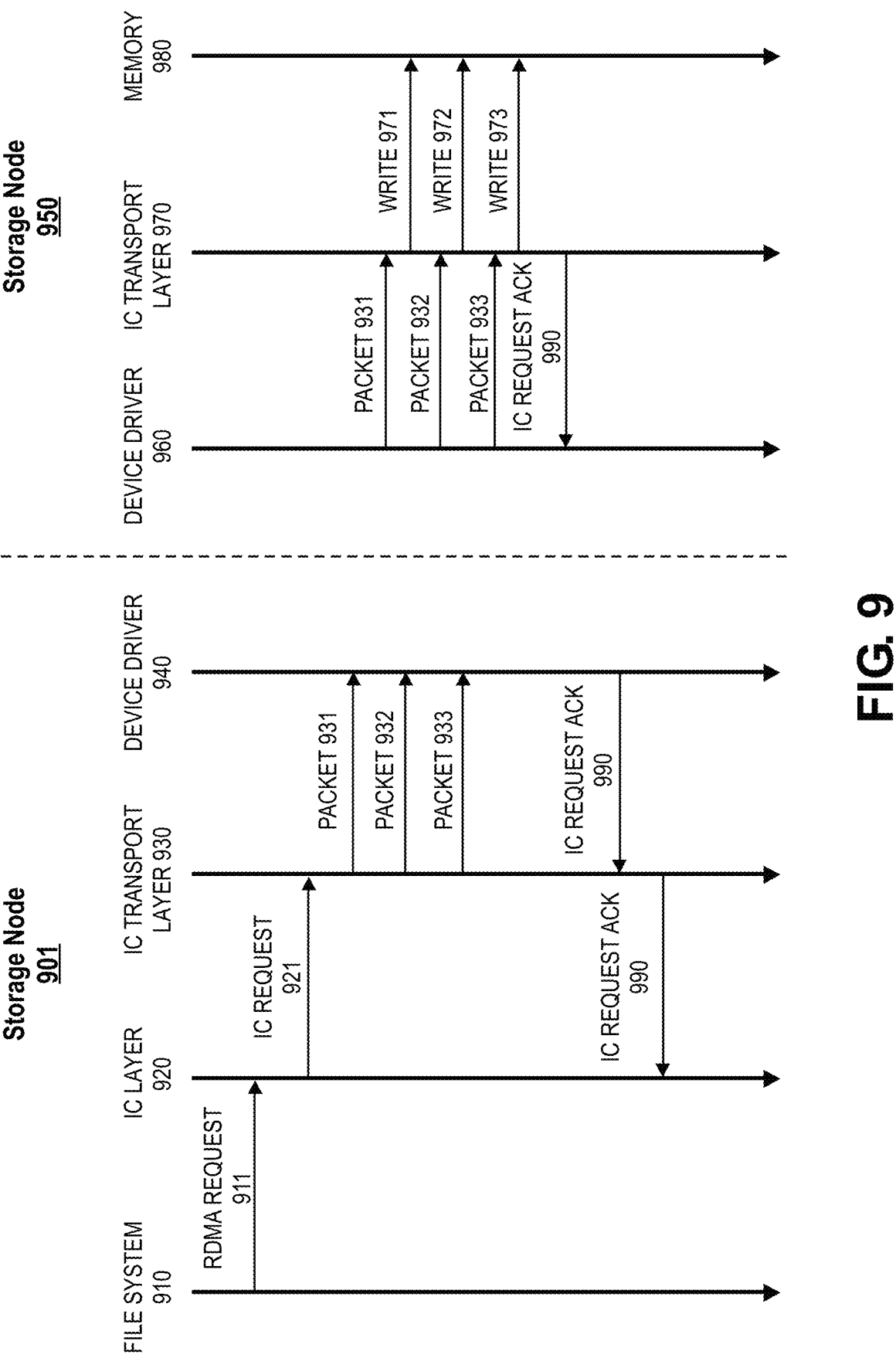
FIG. 9 illustrates data flow from a storage node 901 to a storage node 950.

FIG. 9 illustrates data flow from a storage node 901 to a storage node 950 over a single transport layer session for ease of explanation. An RDMA request 911 is generated at File System layer 910 and sent to the IC layer 920. The RDMA request 911 is converted into IC request 921 at the IC layer 920. The IC request 921 can be further split into multiple packets 931-933 (e.g., ethernet packets) based on a maximum transmission unit (MTU) size and the way the data was constructed. A MTU is the largest packet or frame size, specified in octets (eight-bit bytes) that can be sent in a packet or frame-based network such as the internet. The IC transport 930 adds transaction IDs to each packet 931-933, an initial offset address to packet 931 and increasing offset address values to packets 932 and 933. A device driver 940 (e.g., network interface card (NIC) driver, storage driver, device driver 236d, 246d, 336d, 346d) transmits the packets 931-933 to a device driver 960 of the storage node 950.

On receive side of the storage node 950, the packets 931-933 are sent from the device driver 960 to the IC transport layer 970 for reordering and then data of the packets (e.g., writes 971-973) is written to memory 980 (e.g., NVRAM) in order. When an IC request is completed on receive side of the storage node 950, an acknowledgement message 990 (ACK) is sent from the IC transport layer 970 to the device driver 960 to the device driver 940 to the IC transport layer 930 and then to the IC layer 920.

If a RDMA request must be split into several IC requests due to maximum transfer size limits, the operation of each additional IC request will sequentially follow the IC request 921.

Figure 10:
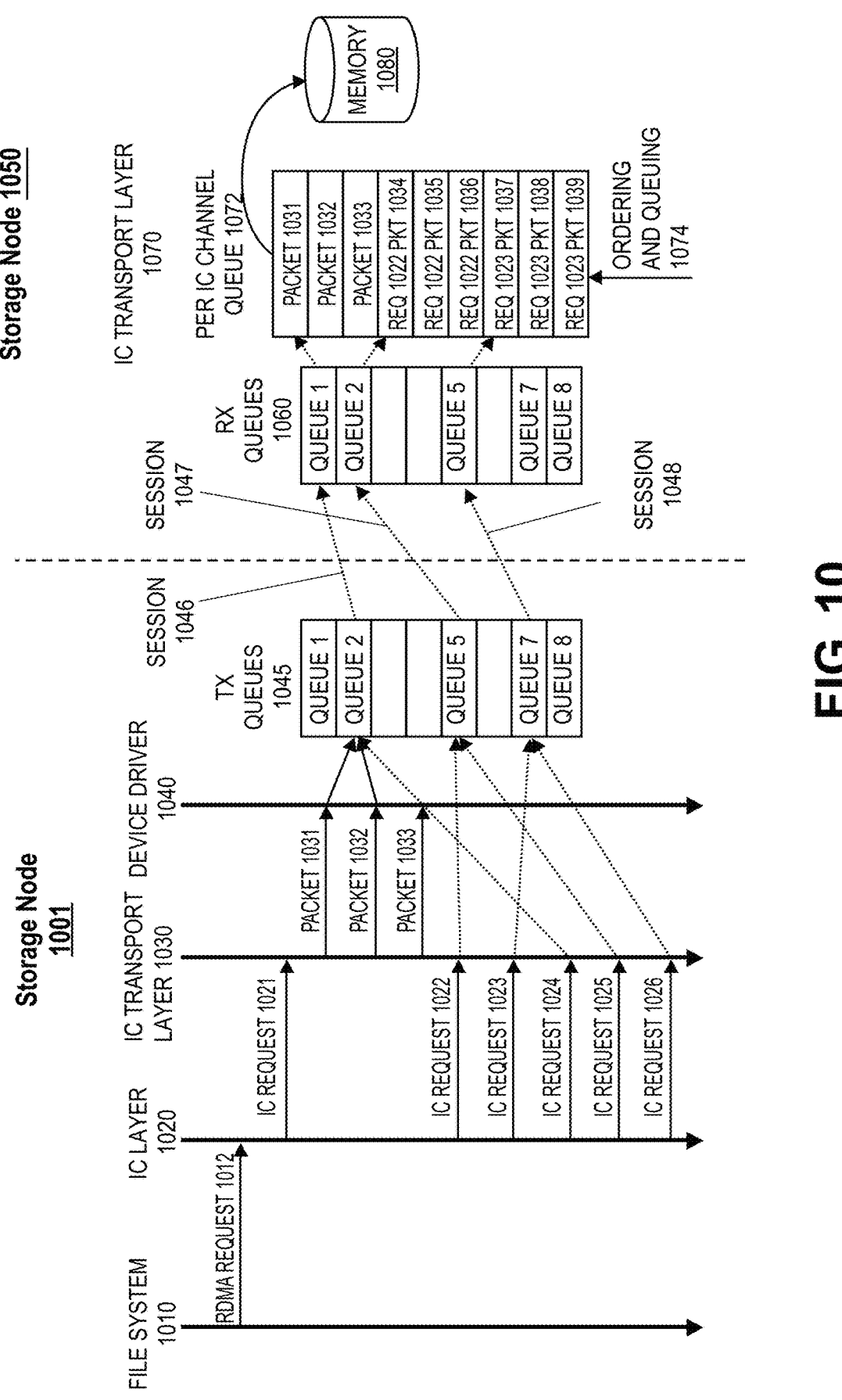
FIG. 10 illustrates the expansion of the IC transport layer to support a mapping of one RDMA stream to multiple transport layer sessions (e.g., UDP sessions, TCP sessions) and how data is processed from one storage node to the other in accordance with one embodiment.

FIG. 10 illustrates the expansion of the IC transport layer to support a mapping of one RDMA stream or IC channel to a group of multiple transport layer sessions (e.g., UDP sessions, TCP sessions) in accordance with one embodiment. A file system layer 1010 can generate a RDMA request 1012 for a RDMA stream. The RDMA request 1012 is sent to the IC layer 1020, and the RDMA request is split into IC requests 1021-1026 based on a maximum transfer size of a traffic flow. The IC requests 1021-1026 are sent to an IC transport layer 1030. In another embodiment, some of the IC requests, such as IC requests 1024-1026, are generated from a different RDMA request.

The IC transport layer 1030 splits the traffic of an IC request 1021 into packets 1031-1033 based on a maximum transmission unit (MTU) size and the way the data was constructed. The IC transport layer 1030 assigns a unique transaction ID to each IC request and a different data offset to each packet for an IC request in order to handle reordering of packets and IC requests at the IC transport layer 1070 of the storage node 1050. The unique transaction ID and data offset can be added to a header of each packet to allow the device driver 1040 to provide the packets into transmit queues 1045 including queues 1-8. The transmit queues 1045 and receive queues 1060 are illustrated with 8 queues but can include any number of queues (e.g., 8, 32, etc.).

In one example, queue 2 of transmit queues 1045 receives packets 1031-1033 and one or more packets from IC request 1024. These packets are for transport layer session (e.g., UDP session, TCP session) 1046 for transfer from transmit queue 2 to receive queue 1 of receive queues 1060 of storage node 1050. Transmit queue 5 of transmit queues 1045 receives packets from IC request 1022 and IC request 1025. These packets are for transport layer session (e.g., UDP session, TCP session) 1047 and transfer from transmit queue 5 to receive queue 2 of receive queues 1060 of storage node 1050.

Transmit queue 7 of transmit queues 1045 receives packets from IC request 1023 and IC request 1026. These packets are for transport layer session (e.g., UDP session, TCP session) 1048 and transfer from transmit queue 7 to receive queue 5 of receive queues 1060 of storage node 1050.

At least three, but potentially all, of the IC requests 1021-1026 are operating generally concurrently to allow the utilization of greater network channel bandwidth than utilized by the example of FIG. 9, where the IC requests of a given IC channel are handled on a single transport session.

The ordering and queueing logic 1074 will then provide an ordering of packets into the per IC channel queue 1072. In one example, FIG. 10 illustrates packets 1031-1033 from IC request 1021 being initially processed, then packets 1034-1036 from IC request 1022 are processed, and then packets 1037-1039 from IC request 1023 are processed based on utilizing the transaction ID and the offset in the header of each packet. For this example, the logic 1074 is processing the IC requests sequentially from 1021 to 1026 though a different order can be provided. If packet 1032 arrives at the receive queues 1060 before packet 1031, then the offset in the header of the packets is used by the logic 1074 to reorder packet 1031, then packet 1032, and then packet 1033. The packets are written from the per IC channel queue 1072 to the memory 1080.

FIG. 10 shows the support of multiple transport layer sessions (e.g., UDP sessions, TCP session) per IC channel and how packets are handled. In this example, an IC channel is mapped to three transport layer sessions (e.g., 3 UDP sessions, TCP sessions). The data traffic of different transport layer sessions (e.g., UDP sessions, TCP session) is distributed to different queues on both send and receive sides. On receive side, the packets for the same IC channel are reordered and put to a receive queue 1072 at IC Transport layer 1070. A per IC channel thread will take packets from the queue, process the packets and copy data from the packets to memory 1080 (e.g., NVRAM).

On the send/transmit side, for the same IC channel, each IC request can be distributed to a different transport layer session(s) (e.g., UDP session, TCP session). The packets of each transport layer session (e.g., UDP session, TCP session) are sent to transmission queues 1045. On the receive side, each transport layer session (e.g., UDP session, TCP session) is mapped to one receive queue (e.g., transport layer session 1046 mapped to queue 1, transport layer session 1047 mapped to queue 2, transport layer session 1048 mapped to queue 5). With multiple transport layer sessions (e.g., UDP sessions, TCP sessions) per IC channel, multiple receive queues 1060 hold the packets from the same IC channel. In order to avoid out-of-order issue, those packets from different receive queues are reordered at IC Transport layer 1070 on receive side and the ordered packets are processed by a per IC channel thread (or per processing resource, per CPU basis) for queue 1072. In one example, packets for each IC channel and associated per IC channel queue are processed by a different processing resource or CPU.

Device Driver

A device driver communicates with an IC transport layer that has been described in conjunction with operations of FIGS. 2, 3, and 6-10. A device driver (e.g., network interface card (NIC) driver, storage driver, device driver 236d, 246d, 336d, 346d, 940, 960, 1040) allows communication between the storage node and external storage devices or storage nodes. A packet out-of-order issue may be a big penalty to performance. This issue has to be minimized or avoided on both send and receive sides of storage nodes. In order to have better performance, a multi-queue feature is enabled for both sending and receiving of data packets. On the send side of a storage node, the packets need to be correctly built to make sure an out-of-order issue does not occur (or is minimized) with the multi-queue feature. On the receive side of the storage node, each queue may be processed by a different processing resource (e.g., CPU). In one example, a first queue is processed by a first CPU, a second queue is processed by a second CPU, and a third queue is processed by a third CPU. Thus, each channel has one send queue on one node and one receive queue on the peered node. Each physical network interface card (NIC) or network adapter can be associated with one or more unique IP addresses. The device driver is software to control the NIC or network adapter.

Example Storage Node

Figure 11:
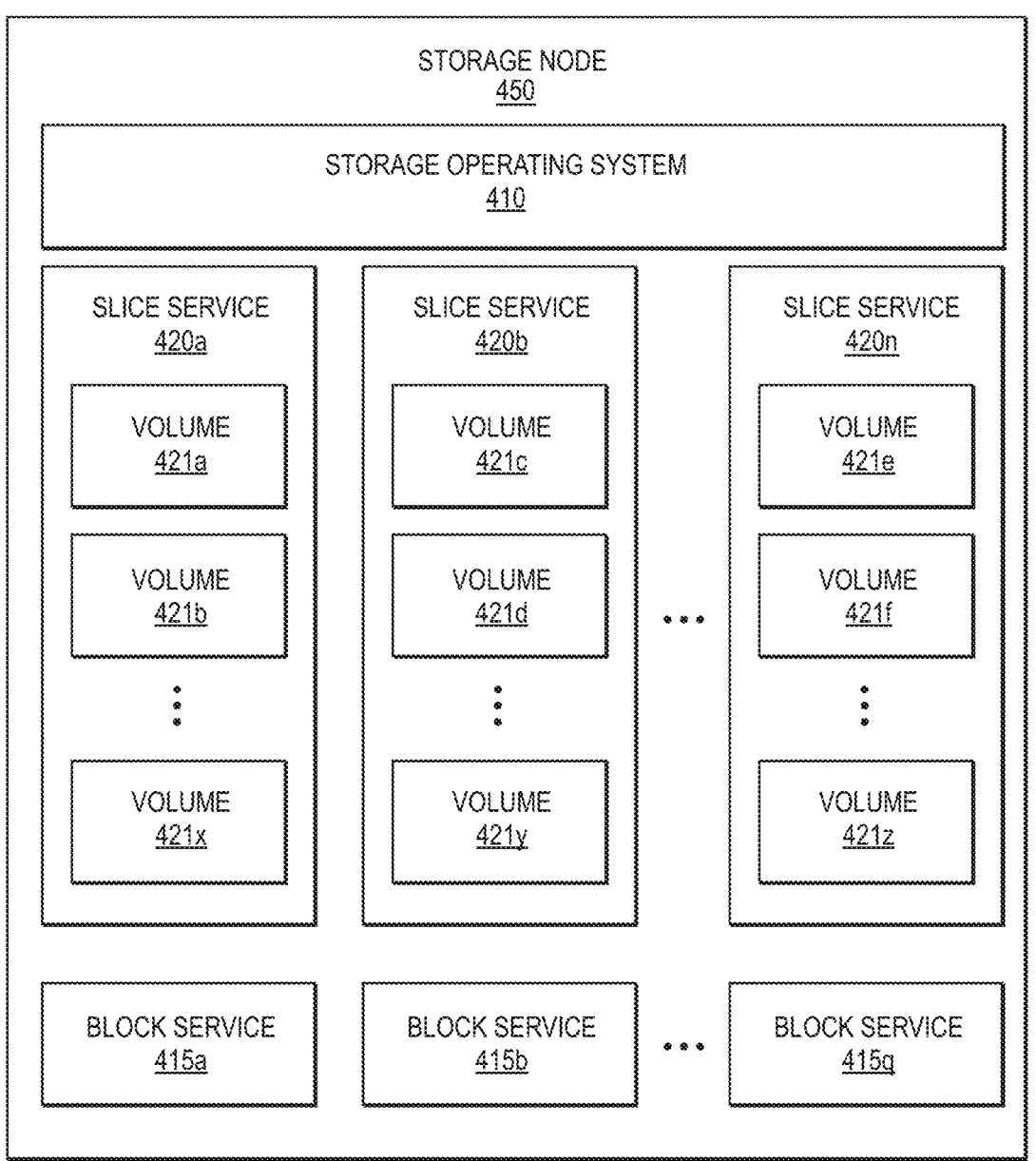
FIG. 11 is a block diagram illustrating a storage node 450 in accordance with an embodiment of the present disclosure.

FIG. 11 is a block diagram illustrating a storage node 450 in accordance with an embodiment of the present disclosure. The storage node 450 represents a non-limiting example of storage nodes (e.g., 110a, 120a, 210, 220, 310, 320) described herein. In the context of the present example, storage node 700 includes a storage operating system 410, one or more slice services 420a-n, and one or more block services 415a-q. The storage operating system (OS) 410 may include a file system layer, an IC layer, an IC transport layer, and a device driver as illustrated in FIGS. 2-3. The storage operating system (OS) can be implemented with a virtual machine or in a private or public cloud. The storage operating system (OS) 410 may provide access to data stored by the storage node 450 via various protocols (e.g., small computer system interface (SCSI), Internet small computer system interface (iSCSI), Fibre Channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 700. In one embodiment, volumes 421 include unique and uniformly random identifiers to facilitate even distribution of a volume's data throughout a cluster. The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 700. Accordingly, a client can access data using a client address, which is eventually translated into the corresponding unique identifiers that reference the client's data at the storage node 700.

For each volume 421 hosted by a slice service 420, a list of block IDs may be stored with one block ID for each logical block on the volume. Each volume may be replicated between one or more slice services 420 and/or storage nodes 700, and the slice services for each volume may be synchronized between each of the slice services hosting that volume. Accordingly, failover protection may be provided in case a slice service 420 fails, such that access to each volume may continue during the failure condition. More details of NVRAM, NV log, LDMA, RDMA, and an exemplary software architecture of a storage node are described in U.S. Pat. No. 7,493,424, which is incorporated by reference herein. All references cited herein are hereby incorporated by reference in their entireties. However, in the event of a conflict between a definition in the present disclosure and one in a cited reference, the present disclosure controls.

Consistency Groups

Figure 12:
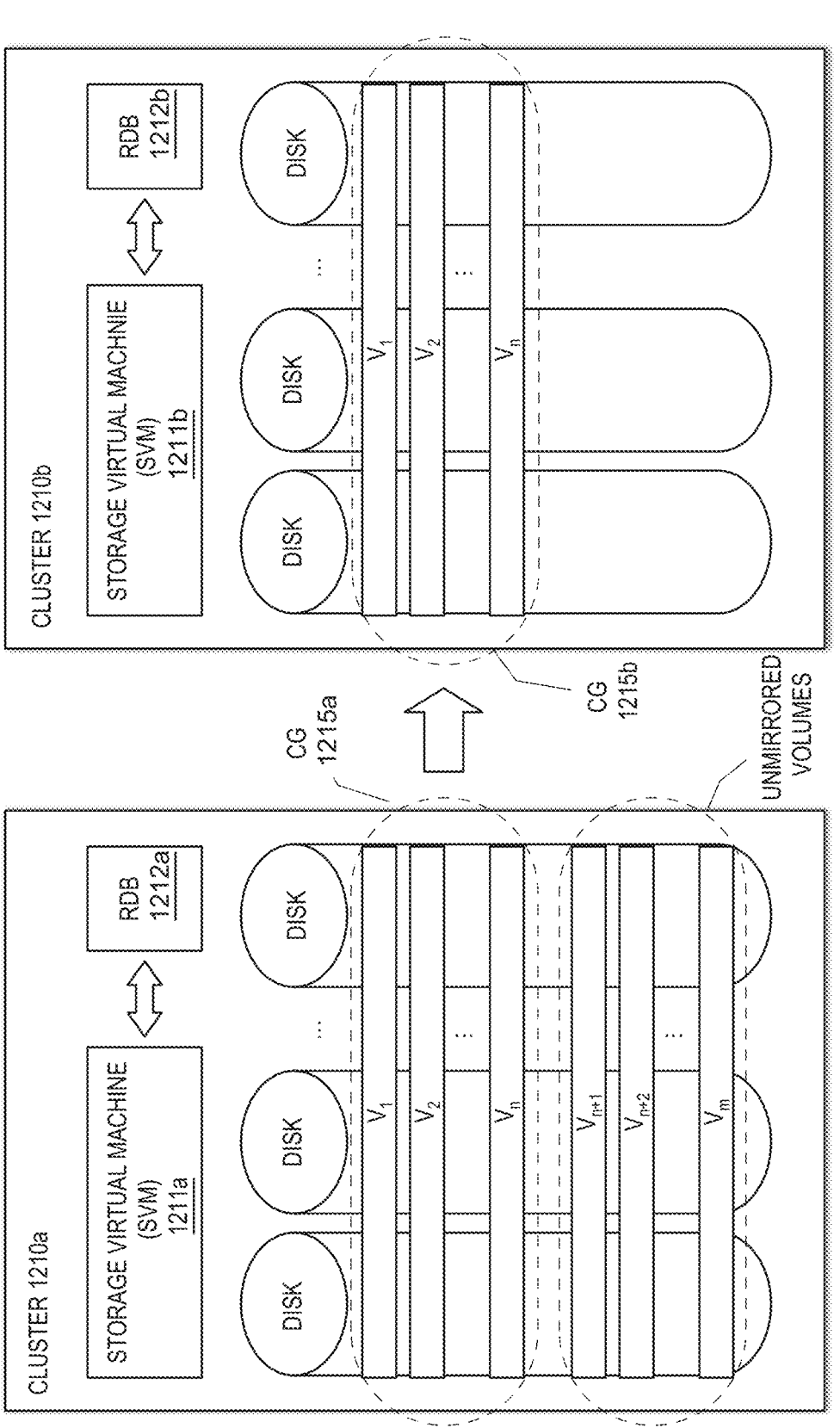
FIG. 12 is a block diagram illustrating the concept of a consistency group (CG) in accordance with an embodiment of the present disclosure.

FIG. 12 is a block diagram illustrating the concept of a consistency group (CG) in accordance with an embodiment of the present disclosure. In the context of the present example, a stretch cluster including two clusters (e.g., cluster 1210a and 1210b) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 1210*a* may be operable within a first site (e.g., a local data center) and cluster 1210*b* may be operable within a second site (e.g., a remote data center) so as to provide non-disruptive operations even if, for example, an entire data center becomes non-functional, by seamlessly failing over the storage access to the mirror copy hosted in the other data center.

A CG is a collection of storage objects or data containers (e.g., volumes) within a cluster that are managed by a Storage Virtual Machine as a single unit. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 1212*a* and 1212*b*), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 1215*b*) to which data is configured to be synchronously replicated may be referred to as being in the role of a destination CG, whereas the CG (e.g., CG 1215*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

In addition, those skilled in the art will appreciate a cross-site high-availability (HA) solution may include more than two clusters, in which a mirrored copy of a dataset of a primary (master) cluster is stored on more than one secondary (slave) cluster.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 13:
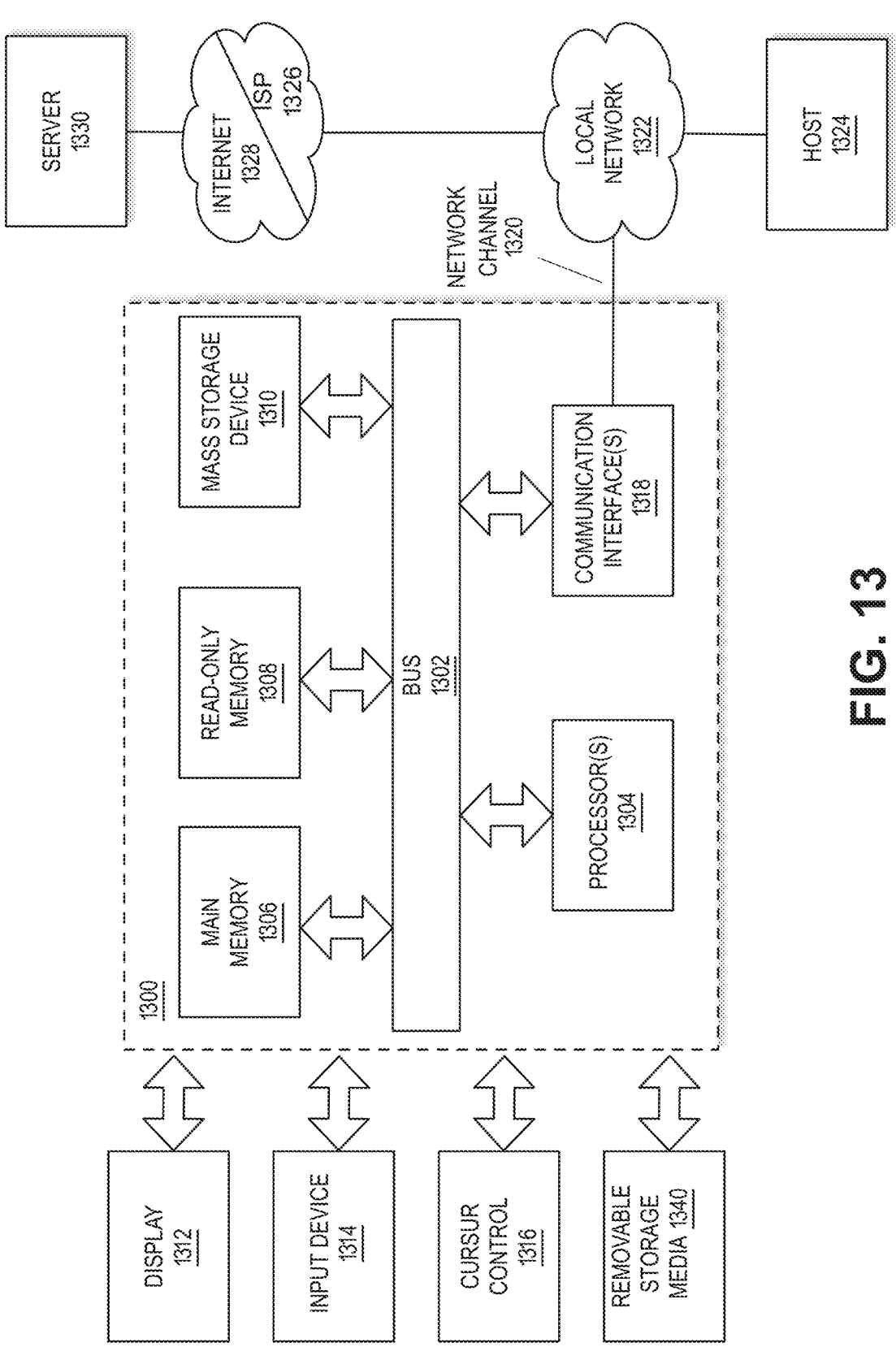
FIG. 13 illustrates an example computer system in which or with which embodiments of the present disclosure may be utilized.

FIG. 13 is a block diagram that illustrates a computer system 1300 in which or with which an embodiment of the present disclosure may be implemented. Computer system 1300 may be representative of all or a portion of the computing resources associated with a node (e.g., storage nodes 110*a*, 120*a*, 210, 220, 310, 320, 901, 950, 1001, 1050, etc.) of a distributed storage system or a storage virtual controller or machine. Notably, components of computer system 1300 described herein are meant only to exemplify various possibilities. In no way should example computer system 1300 limit the scope of the present disclosure. In the context of the present example, computer system 1300 includes a bus 1302 or other communication mechanism for communicating information, and a processing resource (e.g., a hardware processor 1304) coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information dur-ing execution of instructions to be executed by processor 1304. Such instructions, when stored in non-transitory stor-age media accessible to processor 1304, render computer system 1300 into a special-purpose machine that is custom-ized to perform the operations specified in the instructions.

Computer system 1300 further includes a read only memory (ROM) 1308 or other static storage device coupled to bus 1302 for storing static information and instructions for processor 1304. A storage device 1310, e.g., a magnetic disk, optical disk or flash disk (made of flash memory chips), is provided and coupled to bus 1302 for storing information and instructions.

Computer system 1300 may be coupled via bus 1302 to a display 1312, e.g., a cathode ray tube (CRT), Liquid Crystal Display (LCD), Organic Light-Emitting Diode Display (OLED), Digital Light Processing Display (DLP) or the like, for displaying information to a computer user. An input device 1314, including alphanumeric and other keys, is coupled to bus 1302 for communicating information and command selections to processor 1304. Another type of user input device is cursor control 1316, such as a mouse, a trackball, a trackpad, or cursor direction keys for commu-nicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Removable storage media 1340 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1300 may implement the techniques described herein using customized hard-wired logic, one or more ASICs or FPGAs, firmware or program logic which in combination with the computer system causes or programs computer system 1300 to be a special-purpose machine. According to one embodiment, the techniques herein are performed by computer system 1300 in response to proces-sor 1304 executing one or more sequences of one or more instructions contained in main memory 1306. Such instruc-tions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1310. Volatile media includes dynamic memory, such as main memory

1306. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in con-junction with transmission media. Transmission media par-ticipates in transferring information between storage media. For example, transmission media includes coaxial cables, copper wire and fiber optics, including the wires that com-prise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instruc-tions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication inter-face 1318 provides a two-way data communication coupling to a network channel 1320 that is connected to a local network 1322. For example, communication interface 1318 may be an integrated services digital network (ISDN) card, cable modem, satellite modem, or a modem to provide a data communication connection to a corresponding type of tele-phone line. As another example, communication interface 1318 may be a local area network (LAN) card to provide a data communication connection to a compatible LAN. Wire-less channels may also be implemented. In any such imple-mentation, communication interface 1318 sends and receives electrical, electromagnetic or optical signals that carry digital data streams representing various types of information.

Network channel 1320 typically provides data communi-cation through one or more networks to other data devices. For example, network channel 1320 may provide a connec-tion through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network channel 1320 and through communica-tion interface 1318, which carry the digital data to and from computer system 1300, are example forms of transmission media.

Computer system 1300 can send messages and receive data, including program code, through the network(s), net-work channel 1320 and communication interface 1118. In the Internet example, a server 1330 might transmit a requested code for an application program through Internet 1328, ISP 1326, local network 1322 and communication interface 1318. The received code may be executed by processor 1104 as it is received, or stored in storage device 1310, or other non-volatile storage for later execution.

Figure 14:
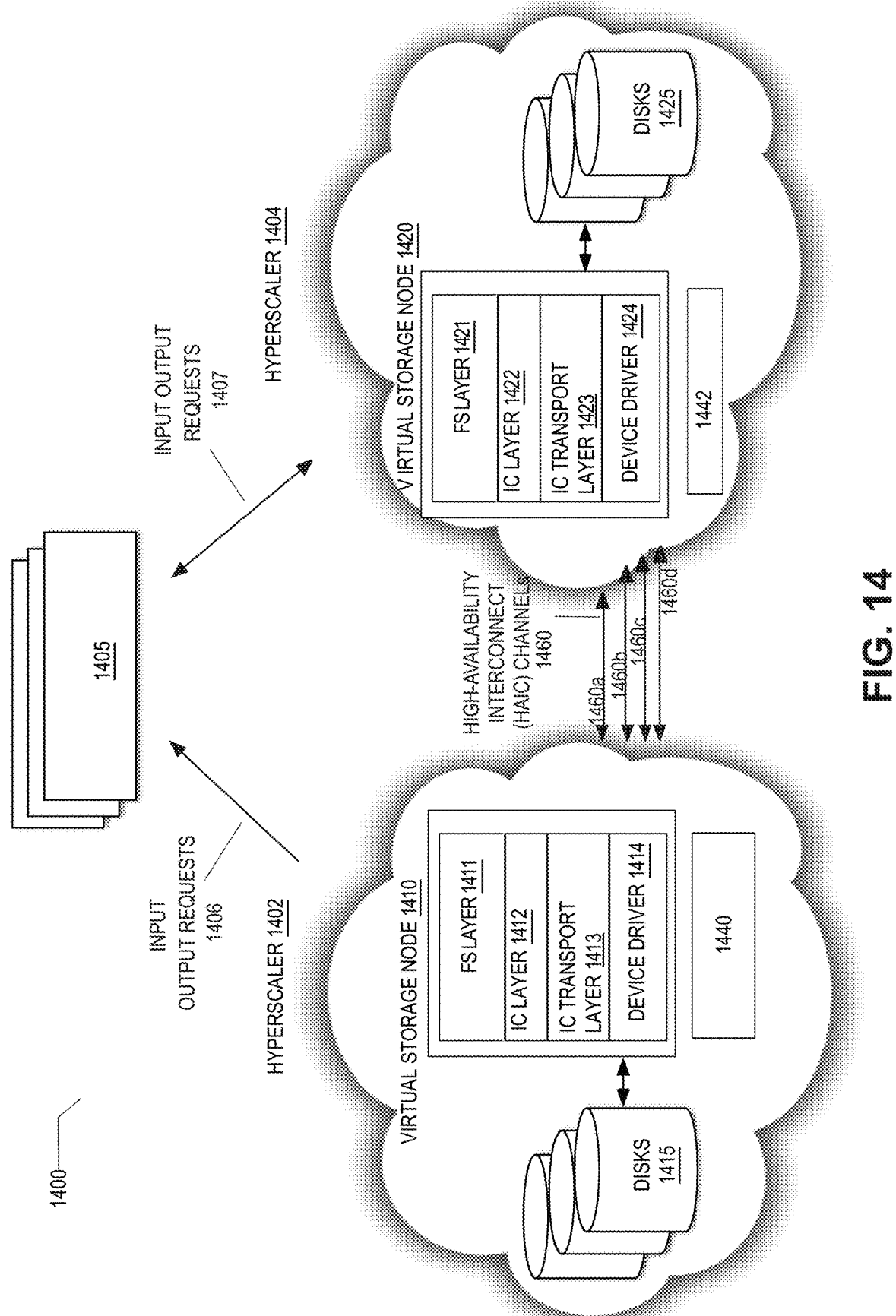
FIG. 14 is a block diagram illustrating a cloud environment in which various embodiments may be implemented.

FIG. 14 is a block diagram illustrating a cloud environment in which various embodiments may be implemented. In various examples described herein, a virtual storage system 1400 may be run (e.g., on a VM or as a containerized instance, as the case may be) within a public cloud provider (e.g., hyperscaler 1402, 1404). In the context of the present example, the virtual storage system 1400 includes virtual storage nodes 1410 and 1420 and makes use of cloud disks (e.g., hyperscale disks 1415, 1425) provided by the hyperscaler.

The virtual storage system 1400 may present storage over a network to clients 1405 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 1405 may request services of the virtual storage system 1400 by issuing Input/Output requests 1406, 1407 (e.g., file system protocol messages (in the form of packets) over the network). A representative client of clients 1405 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 1400 includes virtual storage nodes 1410 and 1420 with each virtual storage node being shown including a number of layers. The virtual storage node 1410 includes a file system (FS) layer 1411, IC layer 1412, IC transport layer 1413, and device driver 1414. The virtual storage node 1420 includes a file system (FS) layer 1421, IC layer 1422, IC transport layer 1423, and device driver 1424. These layers may represent components of data management software (not shown) of the virtual storage system 1400. The file system layer generally defines the basic interfaces and data structures in support of file system operations (e.g., initialization, mounting, unmounting, creating files, creating directories, opening files, writing to files, and reading from files). According to one embodiment, the IC layer makes use of the IC transport layer to encapsulate RDMA frames within Ethernet packets for transmission via the HAIC channels 1460a-1460d. The storage device driver may include storage device drivers for interacting with the various types of hyperscale disks 1415, 1425 supported by the hyperscalers.

The data served by the virtual storage nodes may be distributed across multiple storage units embodied as persistent storage devices (e.g., non-volatile memory 1440, 1442), including but not limited to HDDs, SSDs, flash memory systems, or other storage devices (e.g., 1415, 1425).

Systems and methods are described for a cross-site high-availability distributed cloud storage system to provide multiple channels between storage nodes. According to some embodiments for Example 1, a method performed by one or more processing resources of a first storage node of the distributed cloud storage system comprises providing a remote direct memory access (RDMA) request for a RDMA stream; generating, with an interconnect (IC) layer of the first storage node, multiple IC channels and associating IC requests for the RDMA request; mapping an IC channel to a group of multiple transport layer sessions to split data traffic of the IC channel into multiple packets for the group of multiple transport layer sessions using an IC transport layer of the first storage node; and assigning, with the IC transport layer, a unique transaction identification (ID) to each IC request and assigning a different data offset to each packet of a transport layer session.

Example 2 includes the subject matter of Example 1, wherein a transport layer session of the group of multiple transport layer sessions comprises a user datagram protocol (UDP) session.

Example 3 includes the subject matter of any of Examples 1-2, further comprising sending the packets of each transport layer session to a device driver of the first storage node; and providing, with the device driver, the packets of each transport layer session into a transmission queue based on the unique transaction ID of a header of each packet.

Example 4 includes the subject matter of any of Examples 1-3, wherein the IC transport layer provides a software implementation of RDMA.

Example 5 includes the subject matter of any of Examples 1-4, further comprising determining a number of transport layer sessions for each IC channel based on a maximum transfer size of the transport layer session to fully utilize a network bandwidth between the first storage node and a remote second storage node.

Example 6 includes the subject matter of any of Examples 1-5, wherein the IC transport layer groups two or more transport layer sessions for each IC channel to increase network throughput between the first storage node and a remote second storage node.

Example 7 includes the subject matter of any of Examples 1-6, wherein the IC layer, the IC transport layer, and the device driver form a software stack of the first storage node.

Some embodiments relate to Example 8 that includes a storage node for use in a multi-site distributed storage system, the storage node comprising one or more processing resources; and a non-transitory computer-readable medium coupled to the one or more processing resources, having stored therein instructions, which when executed by the one or more processing resources cause the one or more processing resources to: generate multiple remote direct memory access (RDMA) streams with each RDMA stream to handle multiple RDMA requests; map an IC channel for each RDMA stream to multiple transport layer sessions to split data traffic of each IC channel into multiple packets for multiple transport layer sessions of each IC channel of the storage node; and assign a unique transaction identification (ID) to each IC request of an IC channel.

Example 9 includes the subject matter of Example 8, wherein the transport layer session comprises a user datagram protocol (UDP) session.

Example 10 includes the subject matter of any of Examples 8-9, wherein the instructions when executed by the one or more processing resources cause the one or more processing resources to provide the packets of each transport layer session into a transmission queue based on the unique transaction ID of a header of each packet.

Example 11 includes the subject matter of any of Examples 8-10, wherein the instructions when executed by the one or more processing resources cause the one or more processing resources to assign a different data offset to each packet in order to enable reordering of packets at a remote storage node.

Example 12 includes the subject matter of any of Examples 8-11, wherein the instructions when executed by the one or more processing resources cause the one or more processing resources to determine a number of transport layer sessions based on a maximum transfer size of the transport layer session.

Example 13 includes the subject matter of any of Examples 8-12, wherein the instructions when executed by the one or more processing resources cause the one or more processing resources to group two or more transport layer sessions for each IC channel to increase network throughput between the storage node and a remote storage node.

Example 14 includes the subject matter of any of Examples 8-13, wherein the instructions when executed by the processing resource cause the processing resource to perform a data transfer using the multiple transport layer sessions in order to replicate copies of a journal log of data transfer requests from the storage node to a remote storage node.

Some embodiments relate to Example 15 that includes a non-transitory computer-readable storage medium embodying a set of instructions, which when executed by one or more processing resources of a storage node of a distributed cloud storage system cause the one or more processing resources to receive, with receive queues of a device driver of the storage node, data traffic of multiple transport layer sessions for each interconnect (IC) channel and associated remote direct memory access (RDMA) stream from a remote storage node; map each transport layer session to a single receive queue of the device driver of the storage node; order, with an interconnect (IC) transport layer, IC requests of a first IC channel for the multiple transport layer sessions into a first per IC channel queue based on unique transaction identifiers (IDs) of the IC requests; and order, with the interconnect (IC) transport layer, packets for the first per IC channel queue based on data offsets of the packets per IC request.

Example 16 includes the subject matter of Example 15, wherein each transport layer session comprises a user datagram protocol (UDP) session.

Example 17 includes the subject matter of any of Examples 15-16, wherein the IC transport layer and the device driver form a software stack of the storage node.

Example 18 includes the subject matter of any of Examples 15-17, wherein the set of instructions when executed by a first processing resource of the one or more processing resources cause the first processing resource to process packets of the first IC channel from the first per IC channel queue.

Example 19 includes the subject matter of any of Examples 15-18, wherein the set of instructions when executed by a second processing resource of the one or more processing resources cause the second processing resource to process packets of a second IC channel from a second per IC channel queue.

Example 20 includes the subject matter of any of Examples 15-19, wherein the set of instructions when executed by the one or more processing resources of the distributed cloud storage system cause the one or more processing resources to copy data from the per IC channel queue into non-volatile (NV) memory of the storage node.

What is claimed is:

1. A computer implemented method performed by one or more processing resources of a first storage node of a distributed cloud storage system, the computer implemented method comprising:

providing a remote direct memory access (RDMA) request for a RDMA stream having multiple RDMA requests;

generating, with an interconnect (IC) layer of the first storage node, a number of IC channels and associating IC requests for the RDMA request based on a maximum network throughput limit per transport layer session for mirroring data transfers from the first storage node to a peered second storage node of the distributed cloud storage system;

mapping an IC channel to a group of multiple transport layer sessions;

splitting data traffic of the IC channel into multiple packets of a first transport layer session and associated first IC request and a second transport layer session and associated second IC request for the group of multiple transport layer sessions using an IC transport layer of the first storage node based on the mapping of the IC channel to the group of multiple transport layer sessions; and assigning, with the IC transport layer, a unique transaction identification (ID) to each IC request and assigning a different data offset to each packet of the first transport layer session and the second transport layer session.

2. The computer implemented method of claim 1, wherein a transport layer session of the group of multiple transport layer sessions comprises a user datagram protocol (UDP) session.

3. The computer implemented method of claim 1, further comprising:

sending the packets of each transport layer session to a device driver of the first storage node; and providing, with the device driver, the packets of each transport layer session into a transmission queue based on the unique transaction ID of a header of each packet.

4. The computer implemented method of claim 1, wherein the IC transport layer provides a software implementation of RDMA.

5. The computer implemented method of claim 1, further comprising:

determining a number of transport layer sessions for each IC channel based on a maximum transfer size of each transport layer session to fully utilize a network bandwidth between the first storage node and the peered second storage node.

6. The method of claim 1, wherein the IC transport layer groups two or more transport layer sessions for each IC channel to increase network throughput between the first storage node and the peered second storage node.

7. The method of claim 1, wherein the IC layer, the IC transport layer, and a device driver form a software stack of the first storage node.

8. A storage node for use in a multi-site distributed storage system, the storage node comprising:

one or more processing resources; and a non-transitory computer-readable medium coupled to the one or more processing resources, having stored therein instructions, which when executed by the one or more processing resources cause the one or more processing resources to:

generate multiple remote direct memory access (RDMA) streams with each RDMA stream to handle multiple RDMA requests based on a maximum network throughput limit per transport layer session for mirroring data transfers from the storage node to a peered remote storage node of the multi-site distributed storage system;

map an interconnect (IC) channel for each RDMA stream to multiple transport layer sessions;

split data traffic of each IC channel into multiple packets of a first transport layer session and associated first IC request and a second transport layer session and associated second IC request for multiple transport layer sessions of each IC channel of the storage node based on mapping the IC channel for each RDMA stream to multiple transport layer sessions; and assign a unique transaction identification (ID) to each IC request of each IC channel.

9. The storage node of claim 8, wherein the first transport layer session comprises a user datagram protocol (UDP) session.

10. The storage node of claim 8, wherein the instructions when executed by the one or more processing resources cause the one or more processing resources to:

provide the packets of each transport layer session into a transmission queue based on the unique transaction ID of a header of each packet.

11. The storage node of claim 8, wherein the instructions when executed by the one or more processing resources cause the one or more processing resources to:

assign a different data off set to each packet in order to enable reordering of packets at the peered remote storage node.

12. The storage node of claim 8, wherein the instructions when executed by the one or more processing resources cause the one or more processing resources to:

determine a number of transport layer sessions based on a maximum transfer size of each transport layer session.

13. The storage node of claim 8, wherein the instructions when executed by the one or more processing resources cause the one or more processing resources to:

group two or more transport layer sessions for each IC channel to increase network throughput between the storage node and the peered remote storage node.

14. The storage node of claim 8, wherein the instructions when executed by the one or more processing resources cause the one or more processing resources to:

perform a data transfer using the multiple transport layer sessions in order to replicate copies of a journal log of data transfer requests from the storage node to the peered remote storage node.

15. A non-transitory computer-readable storage medium embodying a set of instructions, which when executed by one or more processing resources of a first storage node of a distributed cloud storage system cause the one or more processing resources to:

provide a remote direct memory access (RDMA) request for a RDMA stream;

generate, with an interconnect (IC) layer of the first storage node, multiple IC channels and associating IC requests for the RDMA request based on a maximum network throughput limit per transport layer session for mirroring data transfers from the first storage node to a peered second storage node of the distributed cloud storage system;

map an IC channel to a group of multiple transport layer sessions;

split data traffic of the IC channel into multiple packets of a first transport layer session and associated first IC request and a second transport layer session and associated second IC request for the group of multiple transport layer sessions using an IC transport layer of the first storage node based on mapping the IC channel to the group of multiple transport layer sessions; and assign, with the IC transport layer, a unique transaction identification (ID) to each IC request and assigning a different data offset to each packet of the first transport layer session and the second transport layer session.

16. The non-transitory computer-readable storage medium of claim 15, wherein a transport layer session of the group of multiple transport layer sessions comprises a user datagram protocol (UDP) session.

17. The non-transitory computer-readable storage medium of claim 15, wherein the set of instructions when executed by the one or more processing resources of the distributed cloud storage system cause the one or more processing resources to:

send the packets of each transport layer session to a device driver of the first storage node; and provide, with the device driver, the packets of each transport layer session into a transmission queue based on the unique transaction ID of a header of each packet.

18. The non-transitory computer-readable storage medium of claim 15, wherein the IC transport layer provides a software implementation of RDMA.

19. The non-transitory computer-readable storage medium of claim 15, wherein the set of instructions when executed by the one or more processing resources of the distributed cloud storage system cause the one or more processing resources to:

determine a number of transport layer sessions for each IC channel based on a maximum transfer size of each transport layer session to fully utilize a network bandwidth between the first storage node and the peered second storage node.

20. The non-transitory computer-readable storage medium of claim 15, wherein the IC transport layer groups two or more transport layer sessions for each IC channel to increase network throughput between the first storage node and the peered second storage node.

* * * * *